(12) United States Patent
Sato

(10) Patent No.: US 12,028,493 B2
(45) Date of Patent: Jul. 2, 2024

(54) IMAGE FORMING APPARATUS INCLUDING PIVOTABLE DOORS WITH A HANDLE AT AN OVERLAPPING AREA

(71) Applicant: CANON KABUSHIKI KAISHA, Tokyo (JP)

(72) Inventor: Osamu Sato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/160,056

(22) Filed: Jan. 26, 2023

(65) Prior Publication Data
US 2023/0247152 A1      Aug. 3, 2023

(30) Foreign Application Priority Data
Jan. 28, 2022    (JP) ................................. 2022-011687

(51) Int. Cl.
*H04N 1/23*   (2006.01)
*H04N 1/00*   (2006.01)

(52) U.S. Cl.
CPC ............................. *H04N 1/00546* (2013.01)

(58) Field of Classification Search
None
See application file for complete search history.

(56) References Cited

U.S. PATENT DOCUMENTS

| | | | | |
|---|---|---|---|---|
| 6,075,958 A | * | 6/2000 | Gotoh | G03G 21/1638 399/124 |
| 7,758,182 B2 | * | 7/2010 | Yonekawa | B41J 29/13 347/108 |
| 10,564,592 B2 | | 2/2020 | Suzuki | |
| 2005/0134668 A1 | * | 6/2005 | Takahashi | G03G 15/6529 347/156 |
| 2016/0124379 A1 | * | 5/2016 | Okumura | G03G 21/1633 399/107 |
| 2016/0246235 A1 | * | 8/2016 | Koyama | G03G 21/1633 |
| 2021/0063939 A1 | * | 3/2021 | Umeno | G03G 21/1661 |
| 2021/0258441 A1 | * | 8/2021 | Mikashima | G06K 15/408 |
| 2021/0382418 A1 | * | 12/2021 | Onodera | G03G 21/1685 |
| 2022/0350270 A1 | * | 11/2022 | Hiura | G03G 21/1633 |

FOREIGN PATENT DOCUMENTS

JP     2007309956 A     11/2007

* cited by examiner

*Primary Examiner* — Dung D Tran
(74) *Attorney, Agent, or Firm* — ROSSI, KIMMS & McDOWELL LLP

(57) ABSTRACT

An image forming apparatus includes an image forming unit configured to form an image on a sheet, a casing accommodating the image forming unit, a pair of doors which open from center, and a protrusion portion. The pair of doors which open from center include a first door, a second door, and a handle. The handle is disposed on an opposite surface of an exterior surface of the first door. The protrusion portion protrudes from an end of the second door toward the first door in a direction intersecting with the second pivot axis and extending an exterior surface of the second door when the pair of doors are closed. The handle covers a gap between the first door and the protrusion portion in a front-back direction of the image forming apparatus when the pair of doors are closed.

8 Claims, 25 Drawing Sheets

IMAGE FORMING APPARATUS INCLUDING PIVOTABLE DOORS WITH A HANDLE AT AN OVERLAPPING AREA

BACKGROUND OF THE INVENTION

Field of the Invention

This disclosure relates to an image forming apparatus such as a printer, a copy machine, a facsimile, or a multifunctional machine.

Description of the Related Art

In image forming apparatuses, a plurality of units, such as a sheet conveyance unit and an image forming unit are disposed in the interior of a casing. Then, a door is disposed in the casing so as to, in a case such as the occurrence of a jam, in which a sheet is clogged in the sheet conveyance unit or the image forming unit, enable the user to carry out the restoration work of accessing the sheet conveyance unit and the image forming unit and, then, removing a recording material. A configuration in which a left door and a right door are opened separately to either the left or right side with respect to a center position in a width direction of the casing as a boundary (so-called double-door opening) is disclosed in United States Patent No. U.S. Ser. No. 10/564,592B2. In the configuration described above, the left door is disposed so as to be pivotable to the left side around a left end side which is acting as a pivot shaft, and the right door is disposed so as to be pivotable to the right side around a right end side which is acting as a pivot shaft.

In the configuration in which the doors disposed in the casing are opened separately to either the left or right side as described above, there is a case where a handle for opening the doors which are divided into the left and right is configured in such a manner as illustrated in FIGS. 22 and 23. That is, the handle includes an opening 213 through which the user can insert a hand into the interior of the door, and the user can put the hand on the handle from the interior toward the exterior of the door.

In a case where the handle is configured as described above, after having confirmed the passage of a finger through the opening 213, the user puts the finger on the handle 215 by bending the finger. That is, so as to put the finger on the handle 215, the user performs the operation without bending the finger until the passage of the finger through the opening 213. At this time, in a configuration such as illustrated in FIG. 23, in which the right door is disposed further to the right than the handle disposed in the left door, there is the fear of reduction in operability since the finger of the user might be caught by a corner portion R1 of the left door 211.

In view of the problem described above, the purpose of this disclosure is, in a case where doors performing the double-door opening are disposed, to provide the image forming apparatus which enables the user to appropriately put the hand on the handle for opening the door.

SUMMARY OF THE INVENTION

According to a first aspect of the present invention, an image forming apparatus includes an image forming unit configured to form an image on a sheet, a casing accommodating the image forming unit, a pair of doors which open from center including a first door being one of the pair of doors, the first door being configured to pivot around a first pivot axis to be opened and closed with respect to the casing, a second door being another of the pair of doors, the second door being configured to pivot around a second pivot axis to be opened and closed with respect to the casing, and a handle disposed on an opposite surface of an exterior surface of the first door, and a protrusion portion protruding from an end of the second door toward the first door in a direction intersecting with the second pivot axis and extending an exterior surface of the second door in a state where the pair of doors are closed, the handle covering a gap between the first door and the protrusion portion in a front-back direction of the image forming apparatus in the state where the pair of doors are closed.

Further features of the present invention will become apparent from the following description of exemplary embodiments with reference to the attached drawings.

DESCRIPTION OF THE EMBODIMENTS

First Embodiment

Image Forming System

Using FIGS. 1 to 3, an image forming system including an image forming apparatus of this embodiment will be described.

Figure 1:
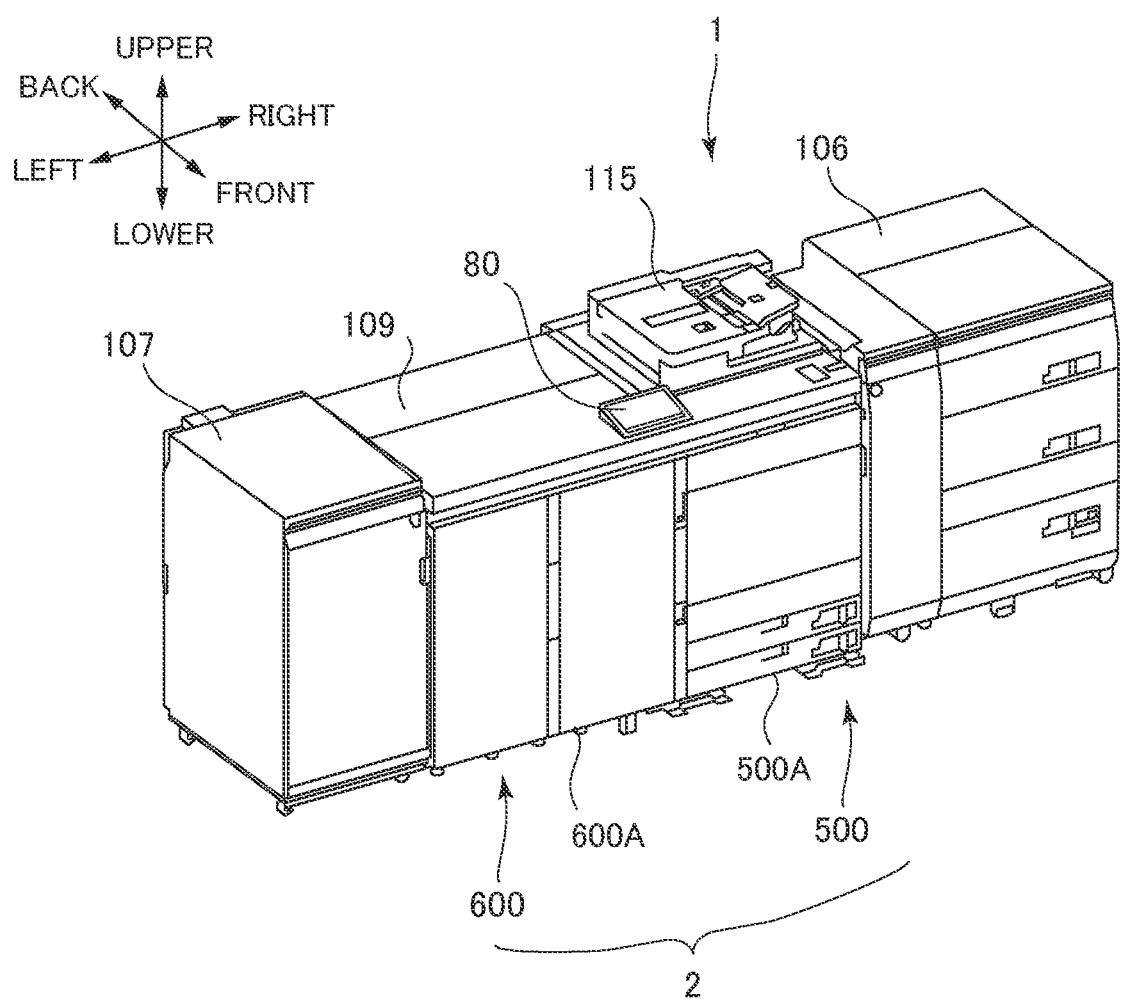
FIG. 1 is a perspective view illustrating an image forming system including an image forming apparatus of this embodiment.
Figure 2:
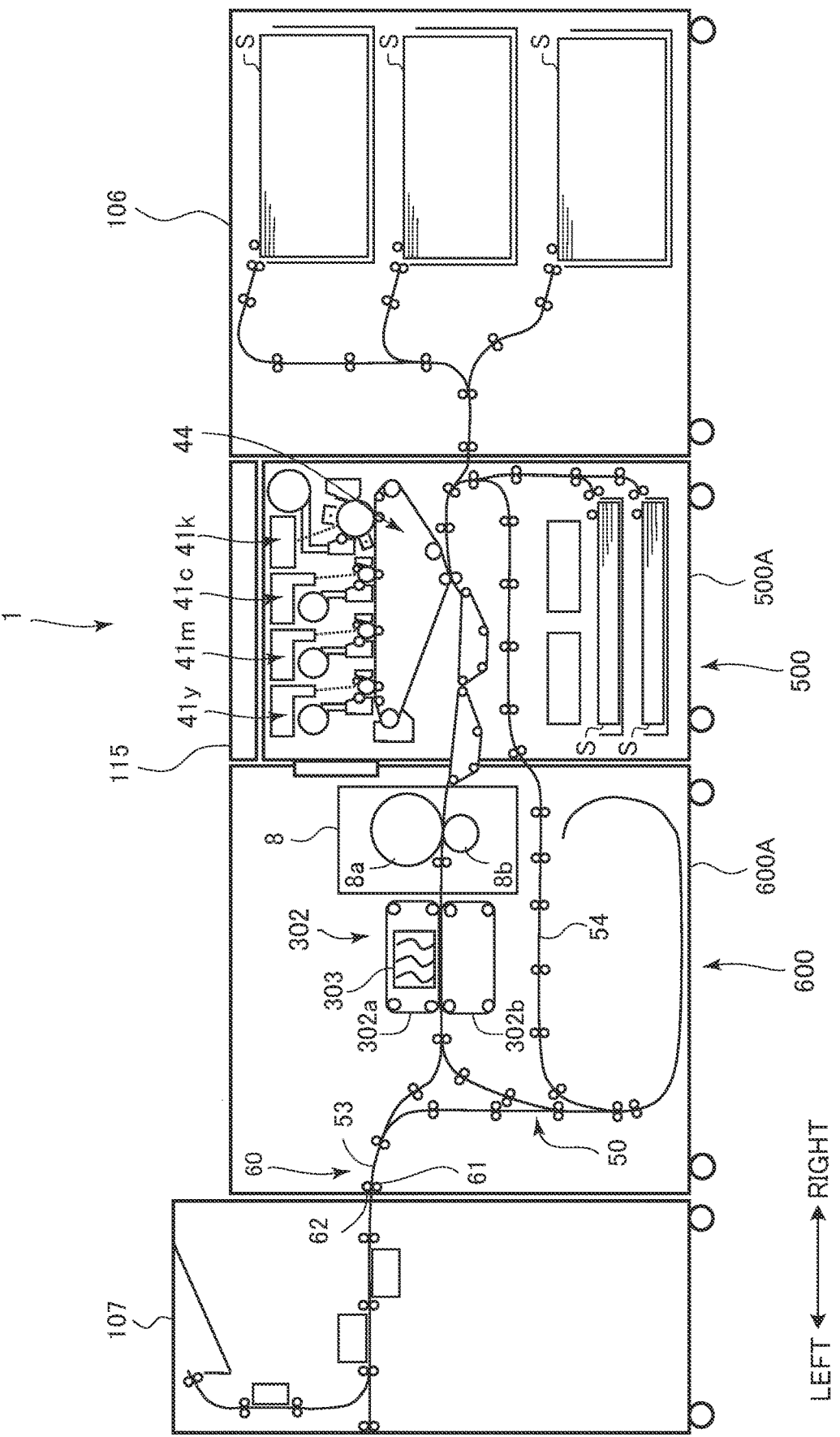
FIG. 2 is a schematic view illustrating the image forming system.

As illustrated in FIGS. 1 and 2, the image forming system 1 includes a sheet feeding apparatus 106, an image forming apparatus 2, and a post-processing apparatus 107. The image forming apparatus 2 is a tandem type electrophotographic full color printer, and, in a case of this embodiment, is divided into a first unit 500 and a second unit 600.

The sheet feeding apparatus 106 and the first unit 500, the first unit 500 and the second unit 600, and the second unit 600 and the post-processing apparatus 107 each are connected to each other in a manner capable of sending and receiving a recoding material (sheet). The sheet feeding apparatus 106 stores a large number of sheets of the recording material, and feeds the stored recording material to the first unit 500. A document reading apparatus 115, for reading an image from a document, and the like are disposed in the first unit 500. To be noted, the recording material includes paper such as standard paper, cardboard, rough paper, uneven paper, and coated paper, a plastic film, and cloth.

An operation unit 80 including a display (such as a liquid crystal touch panel) capable of displaying various information, keys capable of inputting various information in response to a user operation, and the like is disposed on a front surface side of the second unit 600. As a work space for user for the confirmation of the image formed on the recording material and for the organization of the recording material, an upper surface 109 of the second unit 600 is formed in a planar shape so as to make it possible to place the recording material. To be noted, hereinafter, a side on which the user stands at the time of operating the operation unit 80 is called as a front surface (or front), and the opposite side is called as a back surface (or back). Further, the left when viewed from the front surface is called as the left, and the right when viewed from the front surface is called as the right.

The post-processing apparatus 107 is a post-processing unit which can be retrofitted as one of apparatuses configuring the image forming system 1 for enhancements, and performs various post-processing processes with respect to the recording material on which the toner image has been fixed. As the post-processing apparatus 107, one of or combined with a plurality of various apparatuses, for example, such as an inserter, a puncher, a case bookbinding machine, a large capacity stacker, a folding machine, a finisher, and a trimmer, which perform the post-processing, are connected. As described above, in the image forming system 1 illustrated in FIG. 1, the various post-processing apparatuses are selectively connected to the second unit 600 so as to make it possible to output in-line the recording material S as deliverables provided with the various post-processing processes with respect to various materials.

In this embodiment, a casing 500A of the first unit 500 and a casing 600A of the second unit 600 are formed separately from each other, and movable by casters disposed to each casing. Thereby, even in a case where the first and second units 500 and 600 are a large size, it is possible to separately pack and transport the casing 500A and the casing 600A in a separated state, so that it is possible to improve workability up to installation.

The first unit 500 will be described. As illustrated in FIG. 3, a sheet feeding unit 30, an image forming unit 40, part of a sheet conveyance unit 50 (refer to FIG. 2), and an electrical unit 70, and the like are disposed in the interior of the casing 500A of the first unit 500.

The sheet feeding unit 30 is disposed in a lower part in the interior of the casing 500A, and includes a cassette 31, for stacking and storing the recording material S, and a feed roller 32. The sheet feeding unit 30 feeds the recording material S toward the image forming unit 40. As also illustrated in FIG. 2, the sheet conveyance unit 50 is disposed so as to make it possible to send and receive the recording material S in a manner straddling between the casings 500A and 600A. The sheet conveyance unit 50 includes a pre-secondary transfer conveyance path 51, a pre-fixing conveyance path 52, a sheet discharge path 53 (refer to FIG. 3), and a reconveyance path 54, and coveys the recording material S fed from the sheet feeding apparatus 106 and the sheet feeding unit 30 between the first and second units 500 and 600.

The image forming unit 40 forms a toner image on the recording material S in accordance with an image signal received from the document reading apparatus 115 or an external apparatus (not shown) such as a personal computer. The image forming unit 40 includes image forming units 41y, 41m, 41c, and 41k and an intermediate transfer unit 44, and forms the toner image on the recording material S. The image forming units 41y, 41m, 41c, and 41k respectively form toner images of yellow, magenta, cyan, and black, and each of these is disposed detachably from the casing 500A.

The intermediate transfer unit 44 includes a plurality of rollers such as a primary transfer rollers 44y, 44m, 44c, and 44k, a drive roller 44a, a tension roller 44d, and a secondary transfer inner roller 45a, and an intermediate transfer belt 44b wound around these rollers. The primary transfer rollers 44y to 44k are disposed in a manner respectively facing photosensitive drums 47y to 47k, and come into contact with the intermediate transfer belt 44b. By applying a primary transfer voltage to the primary transfer rollers 44y to 44k by a power source, not shown, the toner images formed on the photosensitive drums 4'7y to 47k are sequentially primarily transferred onto the intermediate transfer belt 44b.

The image forming units 41y to 41k are disposed next to each other along a movement direction of the intermediate transfer belt 44b. The intermediate transfer belt 44b is stretched over the plurality of rollers (44a, 44d, and 45a), and rotatably driven. Then, as described below, the intermediate transfer belt 44b bears and conveys the primarily transferred toner image. A secondary transfer outer roller 45b is disposed in a position facing the secondary transfer inner roller 45a, which stretches the intermediate transfer belt 44b, across the intermediate transfer belt 44b, and forms a secondary transfer portion T2 for transferring the toner image on the intermediate transfer belt 44b onto the recording material S.

The image forming units 41y to 41k are substantially the same in a configuration except for differences in developing colors of the toner images. Therefore, the image forming unit 41y of yellow will be described as a representative, and descriptions of the other image forming units 41m, 41c, and 41k will be omitted herein.

The photosensitive drum 47y of a cylindrical shape is disposed in the image forming unit 41y as a photosensitive member. The photosensitive drum 47y is rotatably driven by a motor, not shown. A charge roller 48y, an exposing unit 43y, a developing unit 49y, and the primary transfer roller 44y are disposed around the photosensitive drum 47y.

When an image forming operation is started, a surface of the rotating photosensitive drum 47y is uniformly charged by the charge roller 48y. Next, the photosensitive drum 47y is scanned and exposed by a laser beam irradiated from the exposing unit 43y in accordance with the image signal. Thereby, an electrostatic latent image in accordance with the image signal is formed on the surface of the photosensitive drum 47y. The electrostatic latent image formed on the photosensitive drum 47y is developed into the toner image by developer containing toner and a carrier stored in the developing unit 49y.

The toner image formed on the photosensitive drum 47y is primarily transferred onto the intermediate transfer belt 44b in a primary transfer portion formed with the primary transfer roller 44y disposed across the intermediate transfer belt 44b. At this time, the primary transfer voltage is applied to the primary transfer roller 44y. To be noted, the toner remained on the surface of the photosensitive drum 4'7y after the primary transfer is collected by a drum cleaning blade, not shown.

These operations are sequentially performed in the image forming units 41y to 41k of yellow, magenta, cyan, and black, and the toner images of the four colors are superimposed on the intermediate transfer belt 44b. Thereafter, the recording material S is conveyed to the secondary transfer portion T2 in the timing synchronizing with the formation of the toner image. Then, by applying a secondary transfer voltage to the secondary transfer outer roller 45b, a full color toner image formed on the intermediate transfer belt 44b is collectively secondarily transferred onto the recording material S. To be noted, the toner remained on the intermediate transfer belt 44b after the secondary transfer is collected by a belt cleaning apparatus, not shown.

As illustrated in FIG. 2, the recording material S onto which the toner image has been transferred is conveyed to the second unit 600. A fixing unit 8, a cooling unit 302, and part of the sheet conveyance unit 50 are disposed in the interior of the casing 600A of the second unit 600. The fixing unit 8, serving as a fixing unit, includes a heating roller 8a heated by a heater, not shown, and a press roller 8b pressing the recording material S with respect to the heating roller 8a. The recording material S which is conveyed from the first unit 500 and on which the toner image has been formed is heated and pressed in a fixing nip portion formed by the heating roller 8a and the press roller 8b while being nipped and conveyed. Thereby, the toner image is fixed on the recording material S.

The recording material S heated by the fixing unit 8 is cooled by the cooling unit 302, and then discharged toward the post-processing apparatus 107 describe above. The cooling unit 302 includes conveyance belts 302a and 302b and a heat sink 303. The conveyance belts 302a and 302b nip and convey the recording material S by coming into contact with each other. An inner circumferential surface of the conveyance belt 302a is disposed so as to come into contact with the heat sink 303, and the heat sink 303 cools the conveyance belt 302a. Thereby, the recording material S heated by the fixing unit 8 is cooled when being nipped and conveyed by the conveyance belts 302a and 302b.

A sheet discharge unit 60 includes a sheet discharge roller pair 61 disposed on the sheet discharge path 53 and a sheet discharge port 62 formed in the casing 600A. The sheet discharge roller pair 61 conveys the recording material S conveyed to the sheet discharge path 53 toward the sheet discharge port 62. The sheet discharge port 62 is formed so as to be possible to send and receive the recording material S to and from the post-processing apparatus 107 connected to the casing 600A.

The image forming apparatus 2 of this embodiment can form the image on both surfaces of the recording material S. In a case of simplex printing, the recording material S on which the toner image has been fixed is conveyed to the sheet discharge path 53, and discharged to the outside of the casing 600A from the sheet discharge port 62. In a case of duplex printing, the recording material S on which the toner image has been fixed is conveyed to the reconveyance path 54. The recording material S is inverted in the reconveyance path 54 by a switchback operation, and front and back surfaces of the recording material S are switched. The inverted recording material S is returned to the casing 500A, passes through the pre-secondary transfer conveyance path 51 (refer to FIG. 3), and is conveyed to the secondary transfer portion T2 in a state where the back surface on which the image has not been printed faces a side of the intermediate transfer belt 44b. In the secondary transfer portion T2, the full color toner image formed on the intermediate transfer belt 44b is collectively secondarily transferred onto the back surface of the recording material S. The secondarily transferred toner image on the recording material S is fixed by the fixing unit 8. Thereafter, the recording material S is conveyed to the sheet discharge path 53, and discharged to the outside of the casing 600A from the sheet discharge port 62.

Electrical Unit

Figure 3:
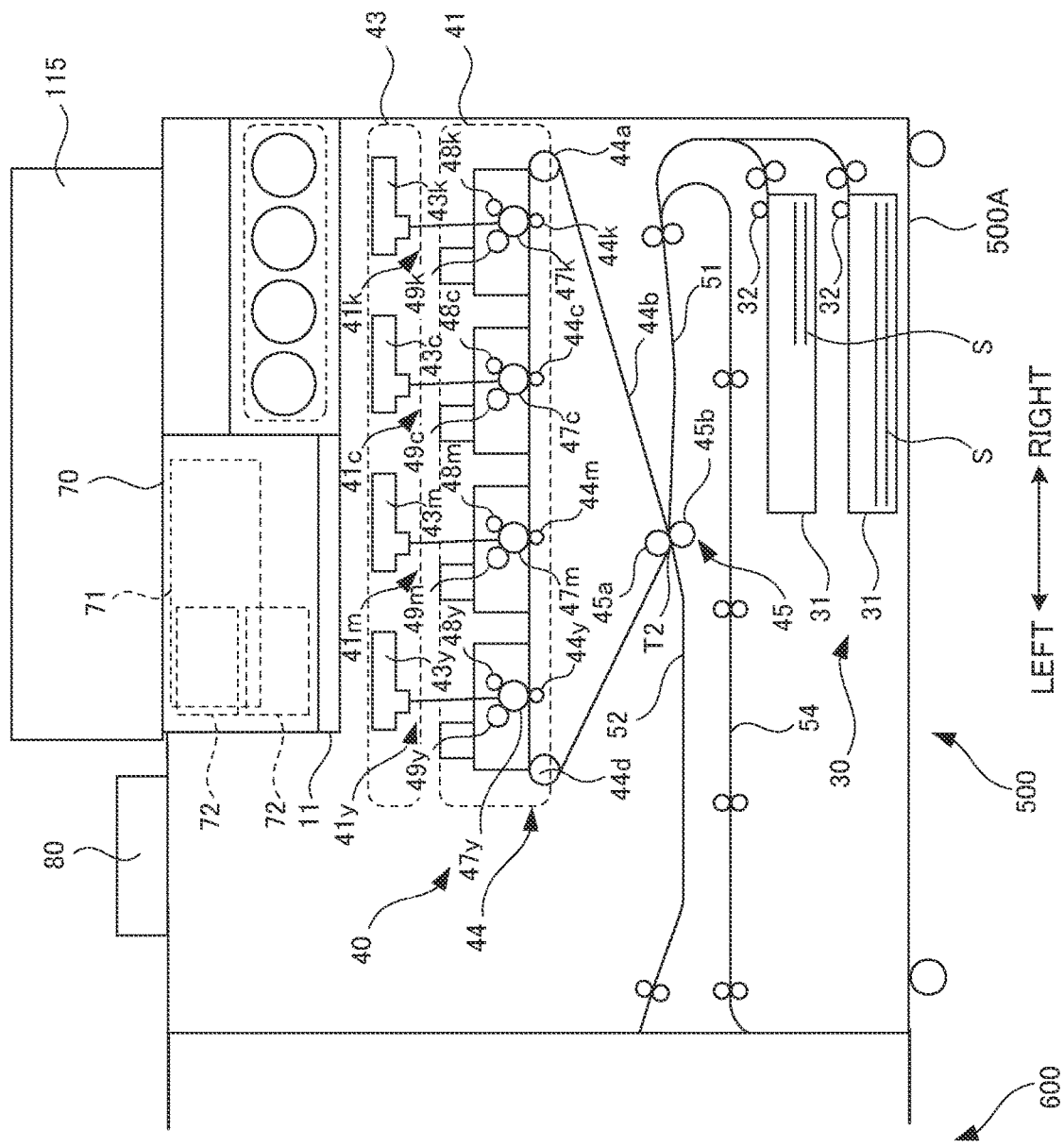
FIG. 3 is a schematic view illustrating a first unit.
Figure 4:
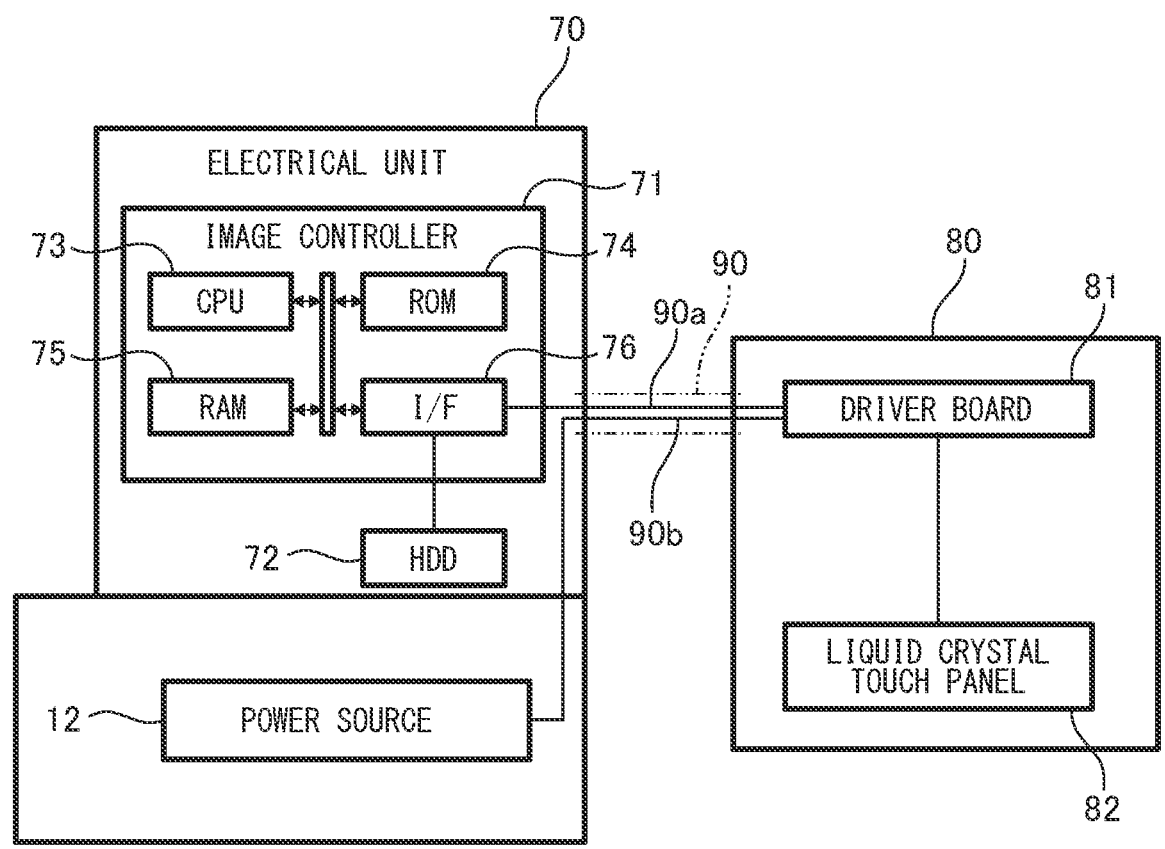
FIG. 4 is a block diagram for descriptions of an electrical unit.

With reference to FIGS. 2 and 3, the electrical unit 70 will be described using FIG. 4. As illustrated in FIG. 4, the electrical unit 70 includes an image controller 71, which is a main control board, and a hard disc drive (hereinafter referred to as HDD) 72. The image controller 71 includes, for example, a central processing unit (CPU) 73, a read only memory (ROM) 74 storing various programs, a random access memory (RAM) 75 temporarily storing data, and an inputting/outputting circuit (I/F) 76 inputting and outputting a signal. The HDD 72 is a removable large capacity memory, and mainly stores image processing programs, digital image data, and additional information on the digital image data.

The CPU 73 is a microprocessor which governs the whole control of the image forming system 1, and a main body of a system controller. The CPU 73 reads the digital image data and the additional information from the HDD 72 in conjunction with the execution of the image processing programs, and performs the image formation onto the recording material S. The CPU 73 is, via the OF 76, connected to the sheet feeding unit 30, the image forming unit 40, the sheet conveyance unit 50, the sheet discharge unit 60, the fixing unit 8, the cooling unit 302, the HDD 72, the operation unit 80, and the like, and controls operations of these units and devices while sending and receiving the signal to and from these units and devices. To be noted, the user can control the image controller 71 by operating the operation unit 80 or an external apparatus, not shown, such as a personal computer coupled to the first unit 500.

As illustrated in FIG. 4, the operation unit 80 includes a driver board 81 and a liquid crystal touch panel 82. On the liquid crystal touch panel 82, for example, messages notifying a remaining amount of the recording material S stored in the cassette 31 and remaining quantities of the developer in the interiors of the developing units 49y to 49k, a procedure for adding the recording material S, and various information for operating the first unit 500 are displayed. Further, the liquid crystal touch panel 82 receives various input, such as the size and grammage of the recording material S, the density of the image, and settings of a number of output sheets, by the user relating to the image formation.

The operation unit 80 is connected to the electrical unit 70 by a cable 90. The cable 90 includes a signal line 90a and a power supply line 90b, and it is acceptable that the cable 90 is either a wire bundle in which the signal line 90a and the power supply line 90b are combined or a cable in which the signal line 90a and the power supply line 90b are separate from each other. The signal line 90a connects the I/F 76 of the image controller 71 and the driver board 81, and the power supply line 90b connects a power source 12 and the driver board 81, Incidentally, a jam in which the recording material S is clogged in, for example, the image forming unit 40, the sheet conveyance unit 50, and the like sometimes occurs in the image forming system 1 described above. So as to enable the user to perform the recovery work of removing the sheet by accessing the image forming unit 40 and the sheet conveyance unit 50 in such a case, a plurality of doors are disposed in the casings 500A and 600A in an openable and closable manner. Therefore, an overview of the doors disposed in the casings 500A and 600A will be described using FIGS. 5 to 9.

Figure 5:
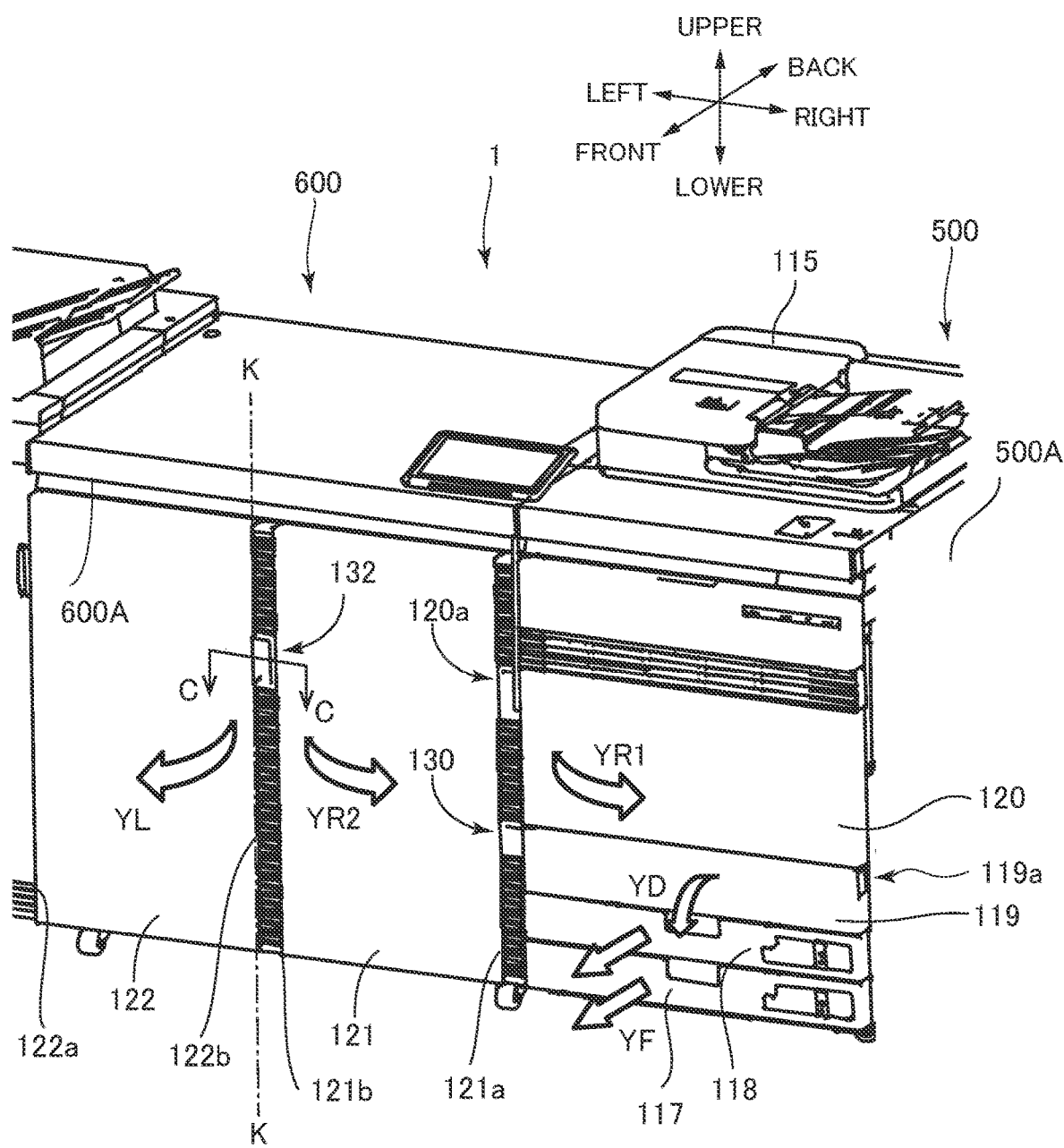
FIG. 5 is a perspective view illustrating an exterior of the first unit.

As illustrated in FIG. 5, three doors in total, one at the front side of the casing 500A and two at the casing 600A, are disposed in the image forming system 1 of this embodiment. In the casing 500A, a front door 120 is disposed in an openable and closable manner. The front door 120 is opened in an arrow YR1 direction around a pivot shaft, not shown, disposed at a right end portion of the casing 500A in a direction substantially parallel to the vertical direction (upper-lower direction) as a center. A concave portion 120a is formed on a side of a right end of a right door 121 so that the user can put a hand on the front door 120 when the user opens the front door 120. In a state where the front door 120 is opened, the user can access the image forming unit 40 and part of the sheet conveyance unit 50 in the interior of the casing 500A.

The cassettes 31 described above are disposed in the casing 500A in a manner openable and closable in a front-back direction, and are drawn out in an arrow YF direction. A recovery toner container, not shown, for collecting the toner is disposed above the cassettes 31. A recovery toner cover 119 is disposed in the casing 500A in an openable and closable manner so as to enable the user to draw out the recovery toner container. The recovery toner cover 119 is opened toward a side of the cassette 31 in an arrow YD direction around a pivot shaft, not shown, disposed substantially parallel to the left-right direction as a center. Concave portions 119a and 130 are respectively formed on a side of a right end of the recovery toner cover 119 and on the side of the right end of the right door 121 so as to enable the user to put a hand on the recovery toner cover 119 when the user opens the recovery toner cover 119. That is, in a case where the user opens the recovery toner cover 119, the user puts the hands on both of the concave portions 119a and 130.

On the other hand, a left door 122, serving as a first door, and the right door 121, serving as a second door, are disposed in the casing 600A in an openable and closable manner. The left and right doors 122 and 121 perform a double-door opening in the left and right directions. That is, the left door 122 includes a first pivot shaft 122a serving as a first pivot axis disposed substantially parallel to the vertical direction, and pivots around the first pivot shaft 122a as a center, so that the left door 122 is openable and closable with respect to the casing 600A. On the other hand, the right door 121 includes a second pivot shaft 121a serving as a second pivot axis disposed substantially parallel to the first pivot shaft 122a in a position opposite to the first pivot shaft 122a with respect to a direction perpendicularly intersecting with the first pivot shaft 122a of the left door 122 (left-right direction), and pivots around the second pivot shaft 121a as a center, so that the right door 121 is openable and closable with respect to the casing 600A. In a state where the left and right doors 122 and 121 are closed, a first end portion 122b opposite to the first pivot shaft 122a of the left door 122 and a second end portion 121b opposite to the second pivot shaft 121a of the right door 121 are disposed so as to face each other by leaving a gap in the left-right direction, and a joint portion K-K is formed. By leaving the gap in between, the left and right doors 122 can perform the double-door opening.

The left door 122 is opened in an arrow YL direction, and the right door 121 is opened in an arrow YR2 direction. A concave portion 132 is formed on a side of a left end of the right door 121 so as to enable the user to put the hand on the left door 121 (in particular, on a handle, described below) when the user opens the left door 122. In the case of this embodiment, as described below, the user can not open the right door 121 unless having opened the left door 122 beforehand. In a state where the left and right doors 122 and 121 are opened, the user can access the fixing unit 8, the cooling unit 302, part of the sheet conveyance unit 50, and the like in the interior of the casing 600A.

Figure 6:
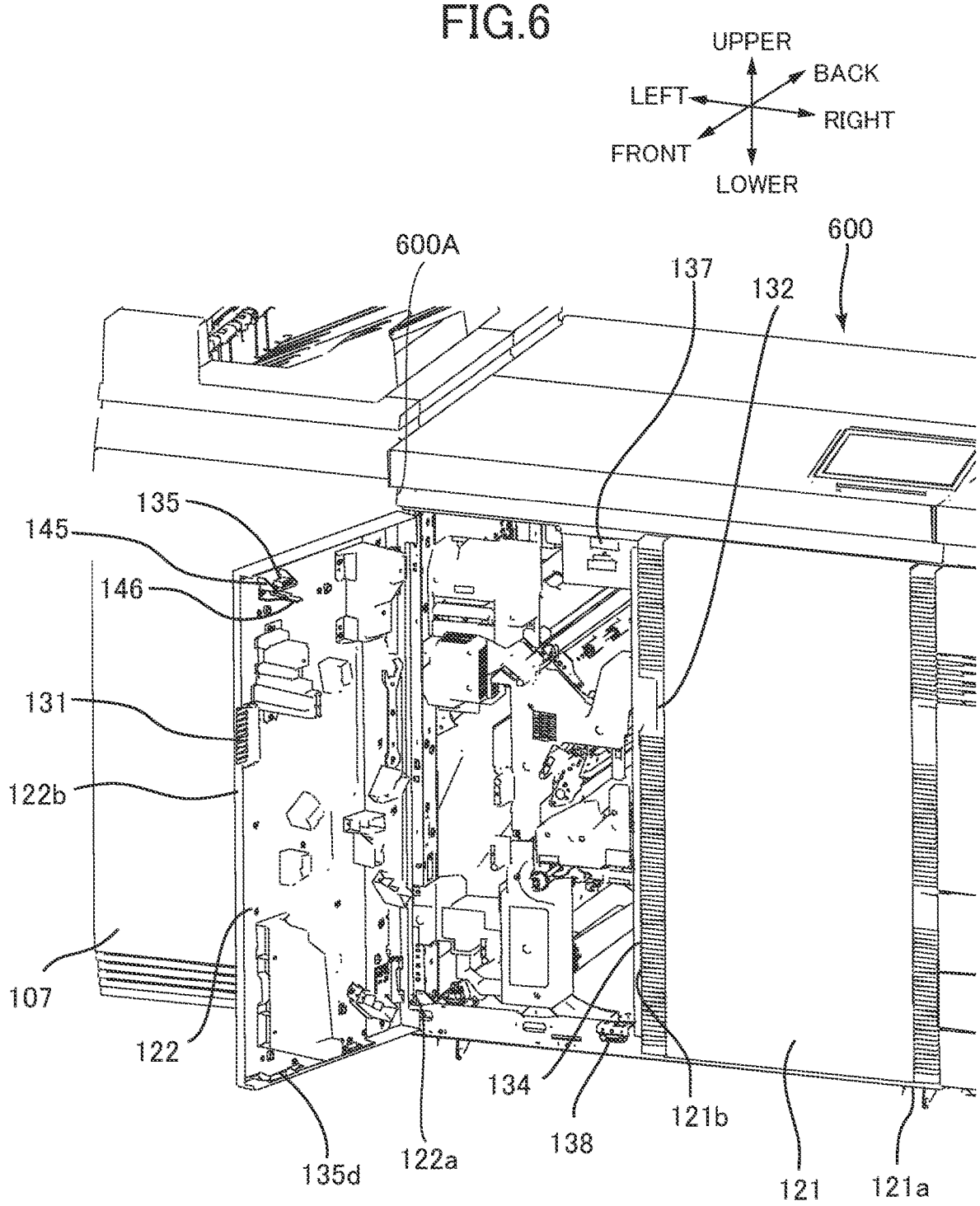
FIG. 6 is a perspective view illustrating a state where a left door is opened.

An opened state of the left door 122 is illustrated in FIG. 6. As illustrated in FIG. 6, in the left door 122, a magnet 135 serving as a first magnet is disposed in an upper part of an inner surface of the left door 122, and a sheet metal member 135d serving as a second metal member is disposed in a lower part of the inner surface. In a case where the left door 122 is closed, the magnet 135 and the sheet metal member 135d respectively come into contact with and stick to, by a magnetic force, a casing side sheet metal member 137 serving as a first metal member and a casing side magnet 138 serving as a second magnet disposed in positions respectively facing the magnet 135 and the sheet metal member 135d. Thereby, the left door 122 is kept in a closed state. That is, the left door 122 includes one of the magnet 135 and the casing side sheet metal member 137 disposed at a position above the handle 131 in a direction along the first pivot shaft 122a, and one of the casing side magnet 138 and the sheet metal member 135d disposed at a position below the handle 131 in the direction along the first pivot shaft 122a.

The magnet 135 is held by a sheet metal holding member 145. A wedge-shaped portion 146 protruding in a wedge shape from the inner surface of the left door 122 is formed in the sheet metal holding member 145. When the left door 122 is closed, the wedge-shaped portion 146 pushes an open/close detection switch (not shown) disposed in the casing 600A for detecting the opening and closing of the left door 122. An open/close state of the left door 122 is detected by an ON/OFF state of the open/close detection switch. When the magnets 135 and 138 are stuck to the sheet metal members 137 and 135d, the open/close detection switch is kept in the OFF state, and the left door 122 is detected to be in the closed state. Attraction forces of both of the magnets 135 and 138 are set at substantially the same, and at, for example, equal to more than 300 gram-force (gf) and equal to or less than 600 gf.

As described above, in a case where the left door 122 is kept in the closed state by the magnets 135 and 138, when the left door 122 is opened, force is applied to each of the upper and lower parts of the left door 122 in an opening direction of the door while resisting pulling forces by the magnets 135 and 138. However, if a difference between the force applied in the opening direction of the left door 122 and the pulling force by the magnet 135 or 138 is largely different in the upper and lower parts of the left door 122, either one of the magnets 135 and 138 is separated from the sheet metal member 137 or 135d earlier than the other. In such a case, torsion is generated in the left door 122, and the left door 122 becomes not to open smoothly. Therefore, in this embodiment, a handle 131 on which the user puts the hand when opening the left door 122 is disposed, with respect to the upper-lower direction, between the magnet 135 in the upper part and the magnet 138 in the lower part. The handle 131 is preferably disposed near a center where distances from the magnets 135 and 138 with respect to the upper-lower direction are substantially the same. As described above, it is possible to achieve a smooth opening and closing operation of the left door 122 by the user by setting the attraction forces of the magnets 135 and 138 at substantially the same and by disposing the handle portion 131 near the center of the left door 122.

Figure 7:
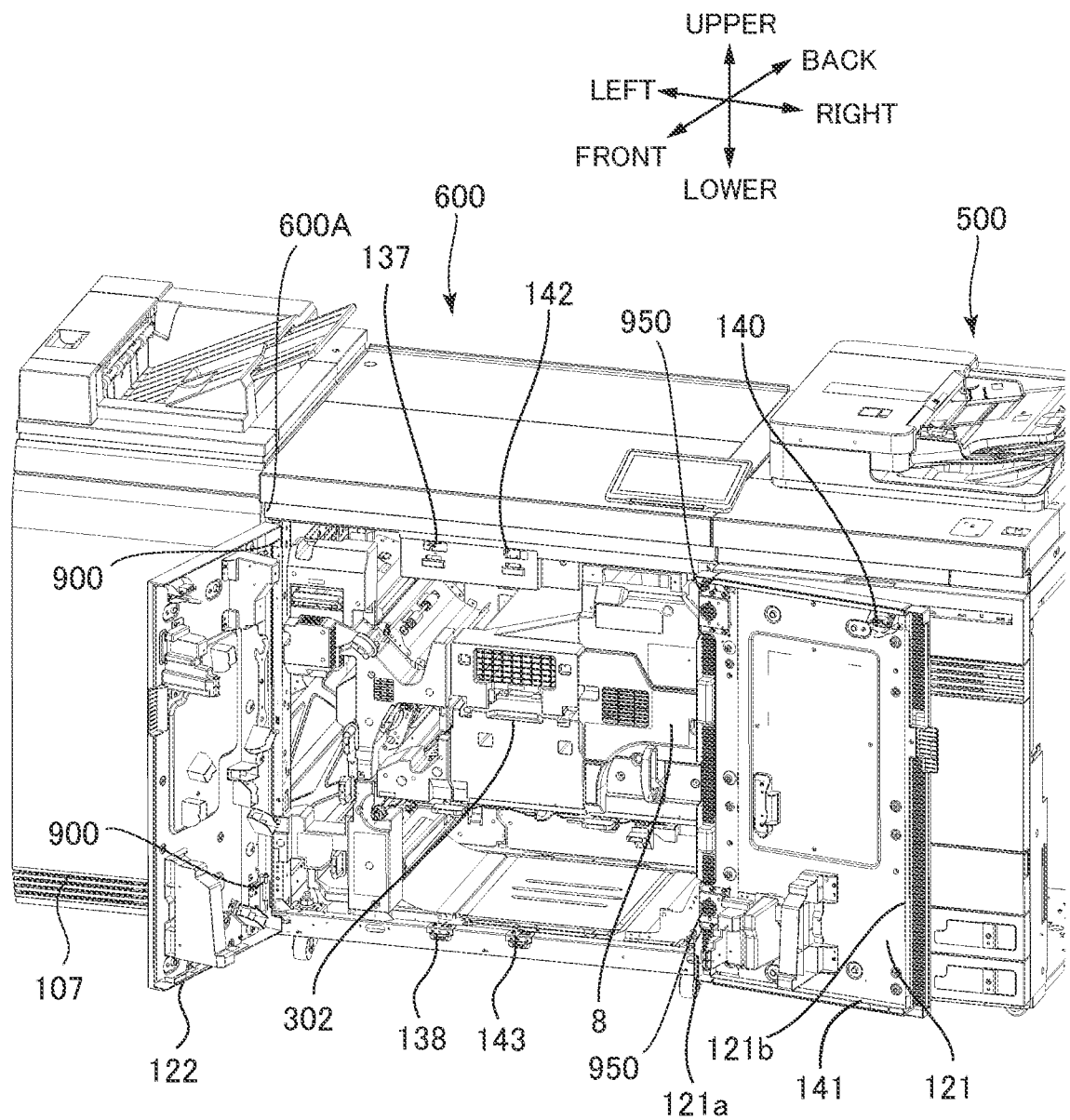
FIG. 7 is a perspective view illustrating a state where the left door and a right door are opened.

The state where the right door 121 is opened along with the left door 122 is illustrated in FIG. 7. As illustrated in FIG. 7, similar to the left door 122, a magnet 140 serving as a third magnet is disposed in an upper part of an inner surface of the right door 121, and a sheet metal member 141 serving as a fourth metal member is disposed in a lower part of the inner surface of the right door 121. In a case where the right door 121 is closed, the magnet 140 and the sheet metal member 141 respectively come into contact with and, by the magnetic force, stick to a casing side sheet metal member 142 serving as a third metal member and a casing side magnet 143 serving as a fourth magnet disposed in positions respectively facing the magnet 140 and the sheet metal member 141. Thereby, the right door 121 is kept in the closed state. To be noted, as illustrated in FIG. 7, the left door 122 is disposed in the casing 600A so as to be pivotably supported by two left door pivot portions 900 disposed in the upper-lower direction, and the right door 121 is disposed in the casing 600A so as to be pivotably supported by two right door pivot portions 950 disposed in the upper-lower direction. These left and right door pivot portions 900 and 950 will be described below (refer to FIGS. 18 and 19). That is, the right door 121 includes one of the magnet 140 and the casing side sheet metal member 142 disposed at a position above the handle 131 in a direction along the second pivot shaft 121a, and one of the casing side magnet 143 and the sheet metal member 141 disposed at a position below the handle 131 in the direction along the second pivot shaft 121a.

Figure 8:
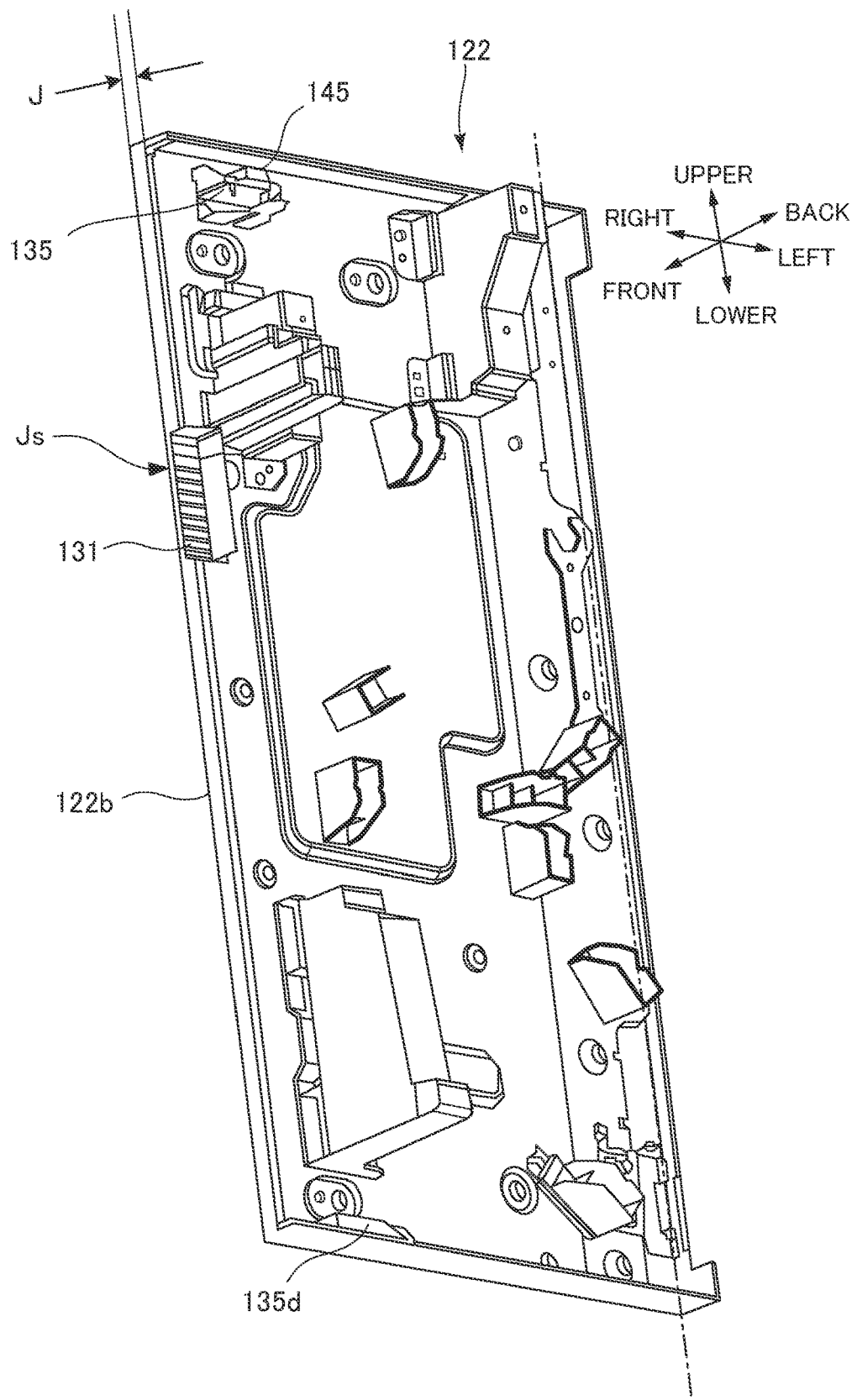
FIG. 8 is a perspective view illustrating the left door when viewed from the back surface.
Figure 9:
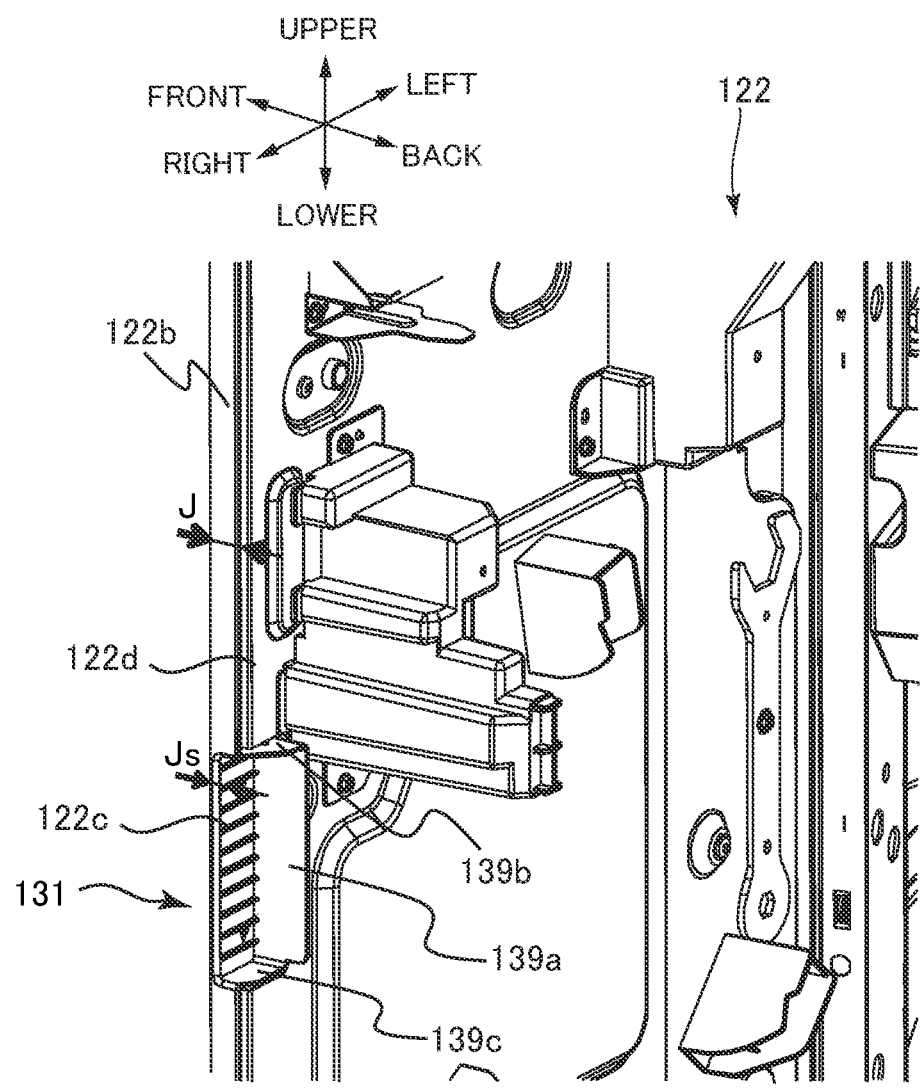
FIG. 9 is an enlarged view illustrating a vicinity of a handle of the left door.

Using FIGS. 8 and 9, the handle 131 of the left door 122 will be described. FIG. 8 illustrates the left door 122 as viewed from the back surface, and FIG. 9 illustrates a vicinity of the handle 131. As illustrated in FIGS. 8 and 9, the handle 131 on which the user puts the hand when opening the left door 122 is disposed in the left door 122. As illustrated in FIG. 9, three sides, except for the side of the right door 121, of the handle 131 are surrounded by ribs 139a, 139b, and 139c integrally formed with the inner surface of the left door 122. The ribs 139a, 139b, and 139c, serving as wall surface portions, are disposed so as to protrude from a first inner surface 122c, which is a first area in which the handle 131 is formed, and so as to extend to inside of the casing 600A from a second inner surface 122d, which is a second area in which the handle portion 131 is not formed. That is, the ribs 139a, 139b, and 139c are disposed so as to form a space into which the user can insert the hand. These ribs 139a, 139b, and 139c restrict such that, when the user puts the hand on the handle portion 131, the hand does not enter too much into the interior of the casing 600A.

Then, in the first end portion 122b of the left door 122, a facing surface which is perpendicular to an external surface of the left door 122 and faces the second end portion 121b (refer to FIG. 6) of the right door 121 in the state where the left door 122 is closed is formed with a width J in the front-back direction (a direction intersecting with the upper-lower direction and the left-right direction), and extends in the upper-lower direction. However, in the facing surface of the left door 122, a width Js of the first area, in which the handle 131 is formed, in the front-back direction is narrower than the width J of the second area in which the handle 131 is not formed. This arrangement is provided so as to facilitate the user to put the hand on the handle portion 131.

Figure 10:
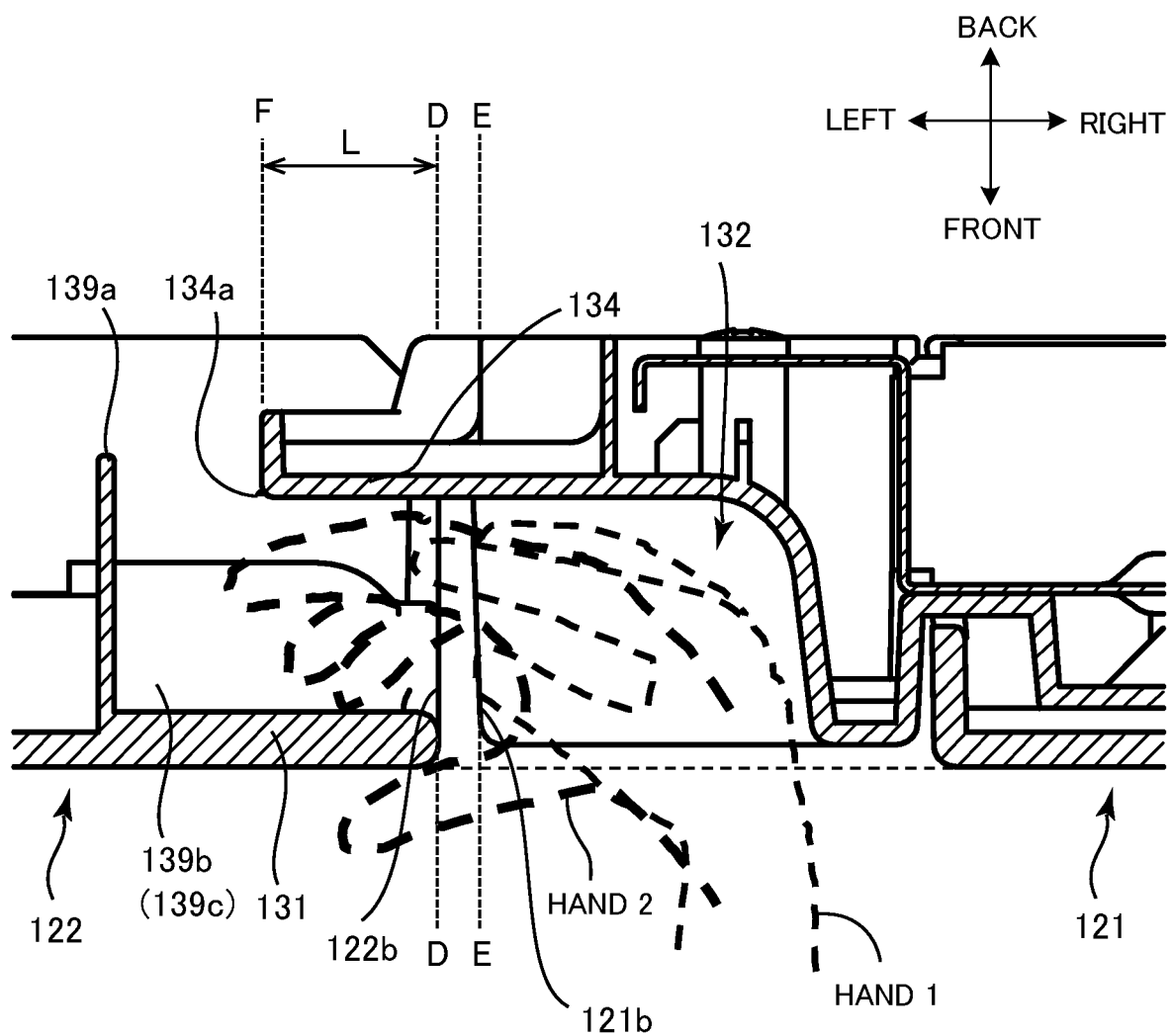
FIG. 10 is a top view illustrating a vicinity of a joint portion of the left and right doors.

Next, using FIGS. 10 to 12, the right door 121 will be described. FIG. 10 is a top view illustrating a vicinity of the joint portion of the left and right doors 122 and 121. As illustrated in FIG. 10, in the state where the left and right doors 122 and 121 are closed, the first end portion 122b of the left door 122 and the second end portion 121b of the right door 121 are disposed so as to face each other by leaving the gap (between D and E) in the left-right direction and form the joint portion. To be noted, the gap between the first end portion 122b of the left door 122 and the second end portion 121b of the right door 121 is set at, for example, equal to or more than 4 millimeter (mm) and equal to or less than 10 mm.

As described above, the handle 131 on which the user puts the hand when opening the left door 122 is disposed in the left door 122. On the other hand, a concave portion 132 which is recessed further to the inside (back surface side) than the external surface is formed in the right door 121 in a position corresponding to the handle 131 of the left door 122 with respect to the upper-lower direction. The concave portion 132 is formed in a shape in which a side of the left door 122 is opened. In a case where the user opens the left door 122, the user inserts the hand into the concave portion 132 of the right door 121 (refer to a hand 2 illustrated in FIG. 10), and, then, the user can put a finger on an inner surface of the handle portion 131. Then, the user can open the left door 122 by pulling the left door 122 to the front direction (to the side of the front surface) while putting the finger on the handle 131.

A protrusion portion 134 is formed in at least the concave portion 132 of the right door 121 so as to overlap the gap (between D and E) between the first and second end portions 122b and 121b when viewed from the outside to the inside of the left door 122 in the state where the left and right doors 122 and 121 are closed. The protrusion portion 134 protrudes from the facing surface of the second end portion 121b, which faces the first end portion 122b of the left door 122 in the state where the left and right doors 122 and 121 are closed, of the right door 121 toward the side of the left door 122 in the left-right direction. In particular, as illustrated in FIG. 10, the protrusion portion 134 is extended from a position E-E of the facing surface of the second end portion 121 so as to position an end 134a in a position F, which is further to the side of the left door 122 than the gap (between D and E). The protrusion portion 134 overlaps the handle 131 of the left door 122 by a distance L which is a distance from a position D-D of the facing surface of the first end portion 121*b*, which faces the second end portion 121*b* of the right door 121 in the state where the left and right doors 122 and 121 are closed, of the left door 122 to the position F of the end 134*a*. The distance L is preferably, for example, equal to or more than 5 mm. When the user inserts the hand into the concave portion 132, since the finger comes into contact with the protrusion portion 134, the finger is not accidentally inserted into the gap (between D and E). Further, since the finger is guided by the protrusion portion 134 to the space formed by ribs 139*a*, 139*b*, and 139*c*, the user can put the finger on the inner surface of the handle portion 131. To be noted, it is not necessary to dispose the protrusion portion over the whole area of the second end portion in the vertical direction, and it is acceptable if at least part of the handle 131 overlaps the protrusion portion in the front-back direction.

Figure 11:
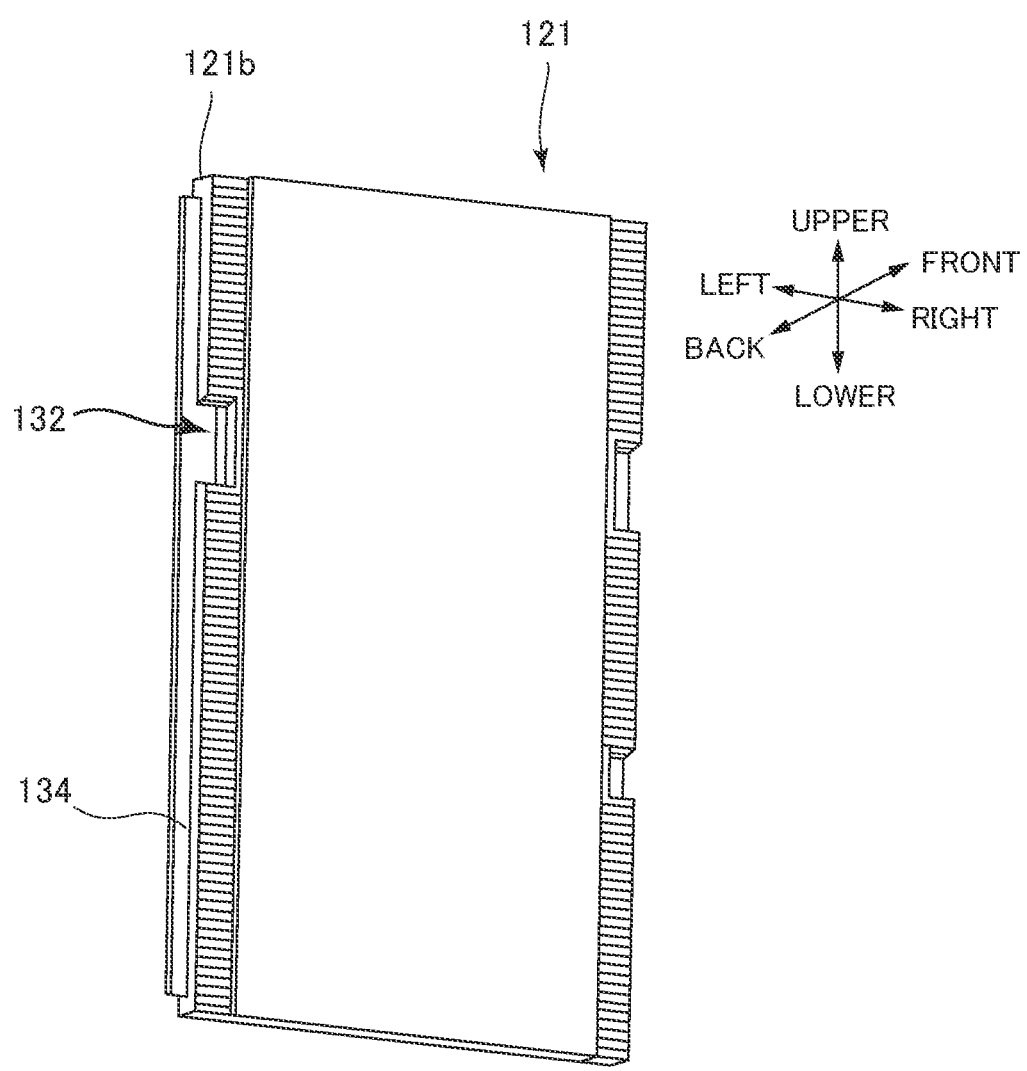
FIG. 11 is a perspective view illustrating the right door when viewed from the front surface.
Figure 12:
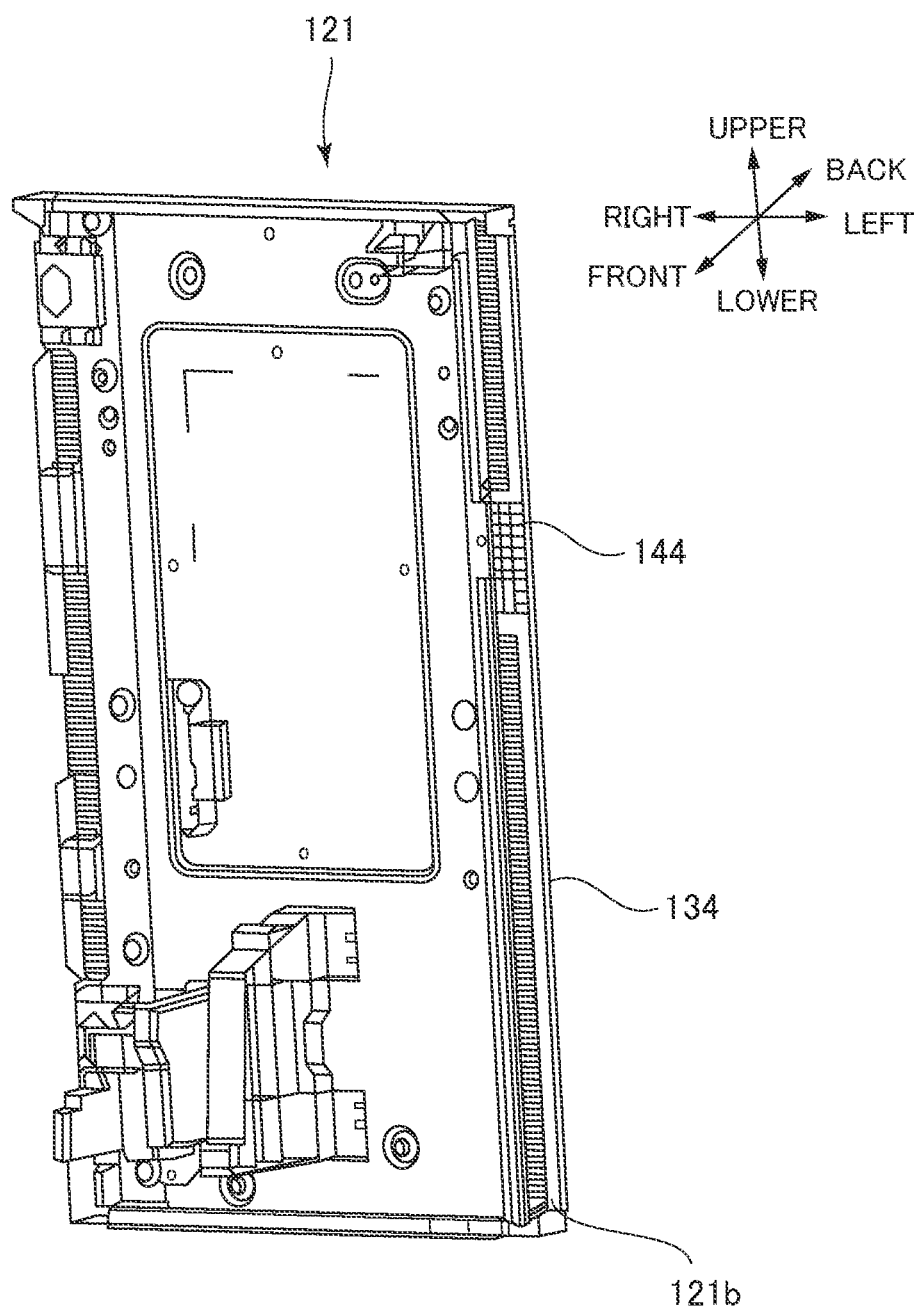
FIG. 12 is a perspective view illustrating the right door when viewed from the back surface.

Then, as illustrated in FIGS. 11 and 12, the protrusion portion 134 of the right door 121 is preferably disposed over not only the concave portion 132 but also almost all areas of the right door 121 in the upper-lower direction. In such a case, the protrusion portion 134 overlaps the gap between the first and second end portions 122*b* and 121*b* over the almost all areas in the upper-lower direction, and it becomes possible to prevent an entry of a foreign substance from the gap into the interior of the casing 600A (refer to FIG. 6). To be noted, as illustrated in FIG. 12, a handle 144 on which the user puts the hand when opening the right door 121 is formed on the back surface of the protrusion portion 134 and in a position opposite to the concave portion 132 across the protrusion portion 134.

Figure 20:
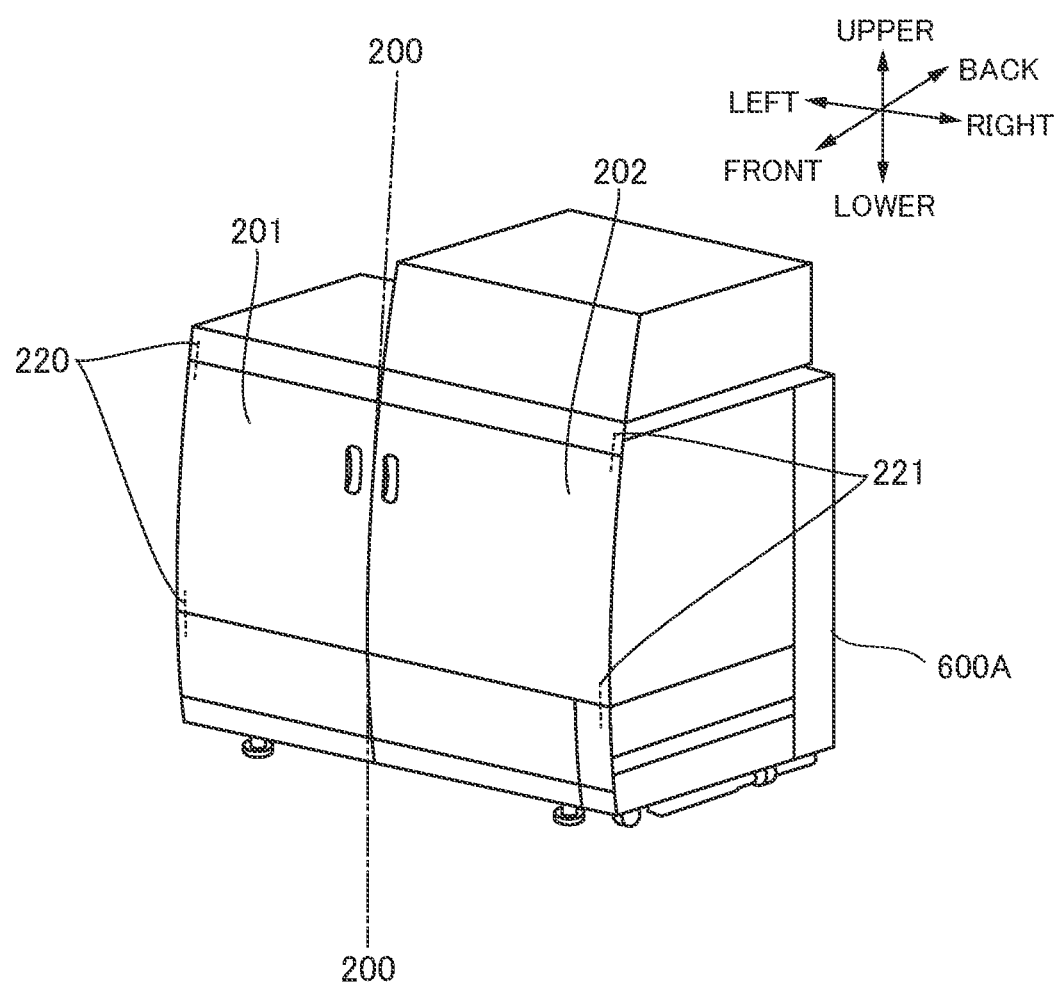
FIG. 20 is a perspective view illustrating a first comparative example.
Figure 21:
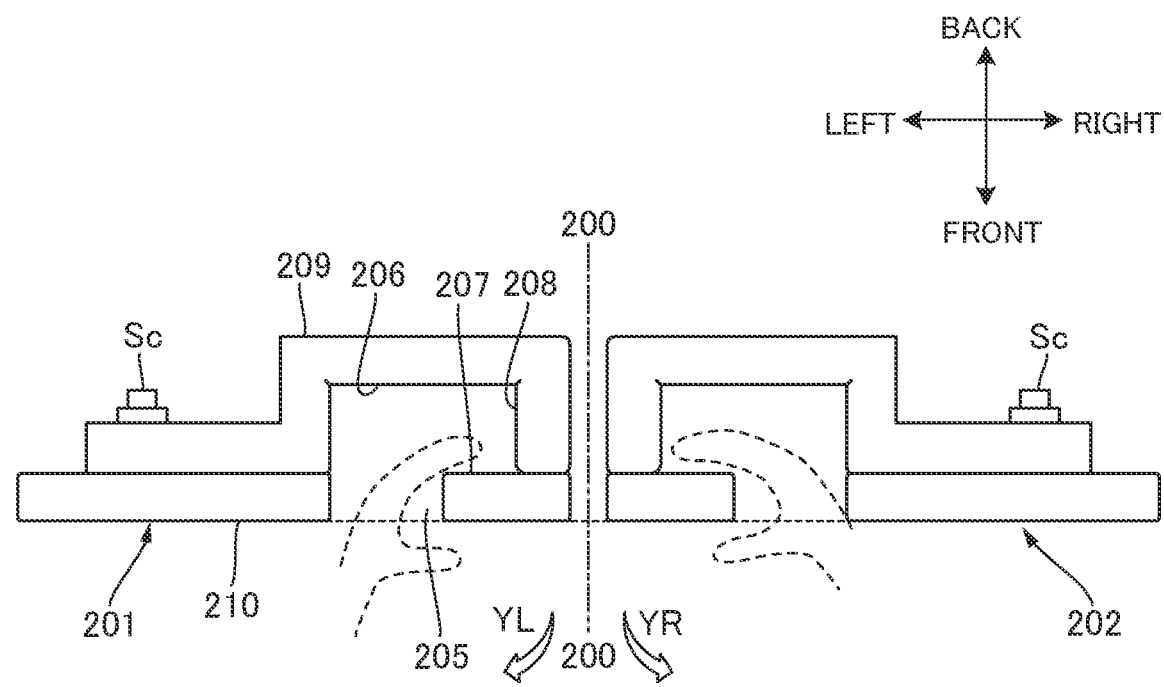
FIG. 21 is a top view illustrating a vicinity of a joint portion of doors in the first comparative example.
Figure 22:
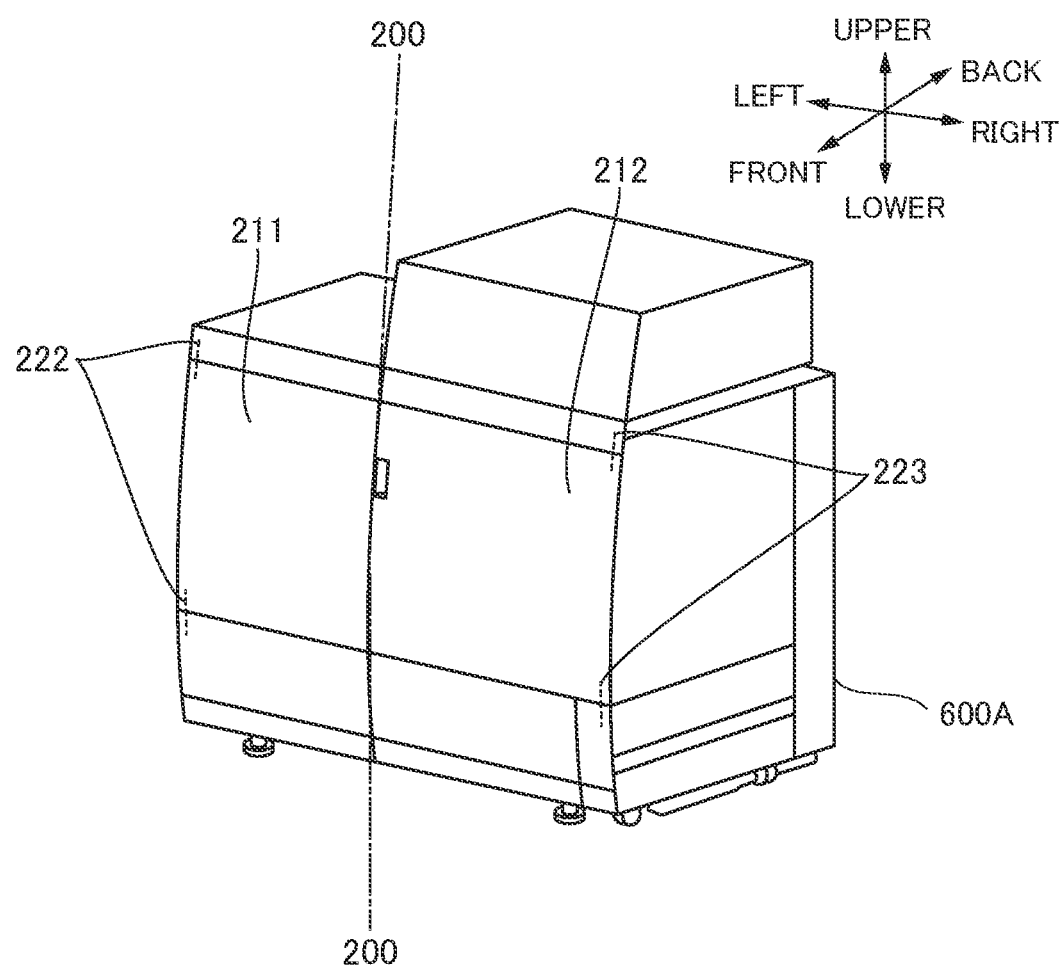
FIG. 22 is a perspective view illustrating a second comparative example.
Figure 23:
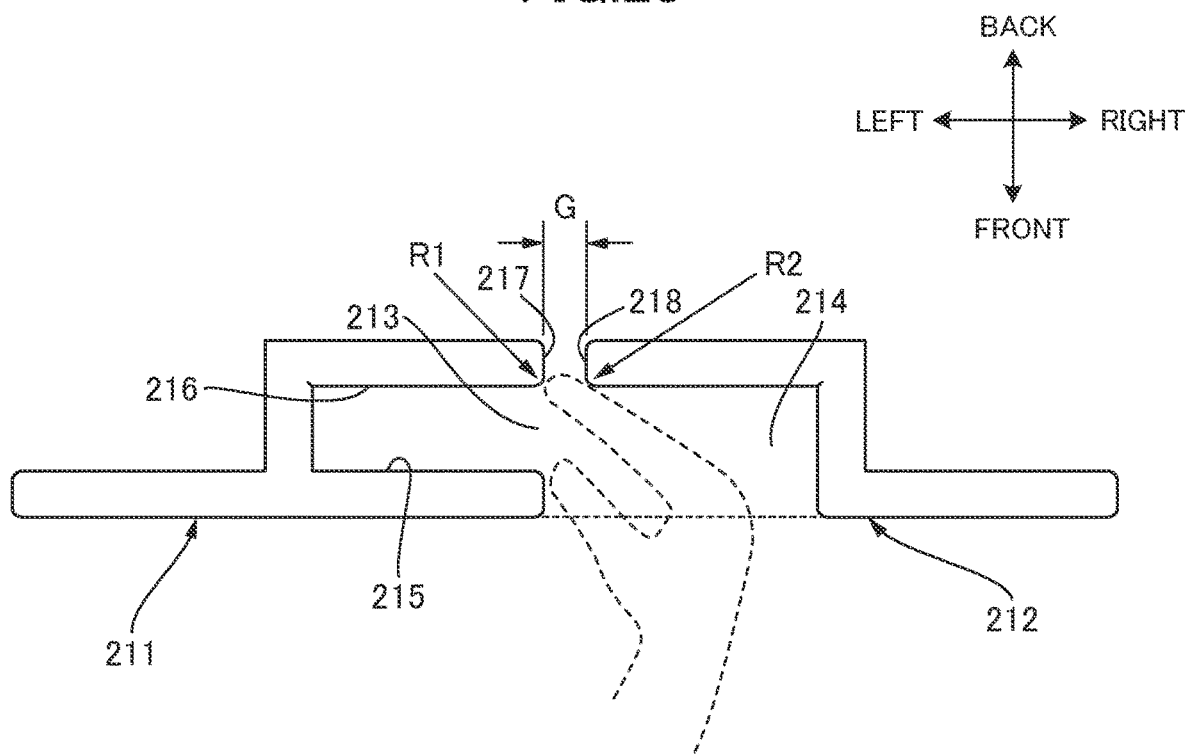
FIG. 23 is a top view illustrating a vicinity of a joint portion of doors in the second comparative example.

Here, a comparative example 1 for comparison with this embodiment is illustrated in FIGS. 20 and 21, and a comparative example 2 for comparison with this embodiment is illustrated in FIGS. 22 and 23. As illustrated in FIG. 20, in the comparative example 1, a left door 201 and a right door 202 which perform the double-door opening by separately opening to the left and right from a position 200 near a center of the front surface of the casing 600A as a boundary are disposed. The left and right doors 201 and 202 are respectively pivotable around pivot shafts 220 and 221 disposed at either end of the casing 600A with respect to the casing 600A as centers.

As illustrated in FIG. 21, a handle 207 on which the user puts the hand is disposed on a right side of an opening portion 205 into which the user inserts the hand, and the handle 207 faces a back-side surface portion 206. Further, an inner-side surface portion 208 is disposed so as to bridge a gap between the handle 207 and the back-side surface portion 206. A gripping portion on which the user puts the finger when putting the finger on an inner surface of the handle 207 is formed by the handle 207, the back-side surface portion 206, and the inner-side surface portion 208, and the back-side surface portion 206 is secured to a front surface plate 210 of the left door 201 by a screw Sc. The user can open the left door 201 by putting the finger on the inner surface of the handle 207 and applying force in an arrow YL direction. Since handles of the left and right doors 201 and 202 are configured to be symmetrical with respect to the position 200 near the center of the left and right doors 201 and 202 as an axis of symmetry, descriptions of the handle of the right door 202 will be omitted herein.

As illustrated in FIG. 22, in the comparative example 2, a left door 211 and a right door 212 which perform the double-door opening by separately opening to the left and right from the position 200 near the center of the front surface of the casing 600A as the boundary are disposed. The left and right door 211 and 212 are respectively pivotable around pivot shafts 222 and 223 disposed at either end of the casing 600A with respect to the casing 600A as centers. However, in the comparative example 2 illustrated in FIG. 22, a handle is formed only in the left door 211 which is configured with a single component.

As illustrated in FIG. 23, an opening 213 is formed in the left door 211 on a side of the right door 212, and the right door 212 includes a concave portion 214 in a position facing the opening 213. A front surface side and a side of the opening 213 of the left door 211 are opened in the concave portion 214, and the concave portion 214 is recessed from an external surface. The user inserts the finger from the concave portion 214 into the opening 213 on a side of the right door 212. In such a case, the finger of the user is surrounded by a handle 215, on which the user puts the finger, and a handle facing portion 216 facing the handle 215. In a case of this configuration, while, as a step to open both of the left and right doors 211 and 212, the left door 211 is first opened and then the right door 212 is opened, it is possible to configure the handle of the left door 211 with the single component. Therefore, so as to suppress component costs for adoption, the comparative example 2 is preferable to the comparative example 1.

However, in a case of the comparative example 2, the pivot shaft 222 of the left door 211 and the pivot shaft 223 of the right door 212 are disposed at either end of the casing 600A (refer to FIG. 22), and a large number of components are disposed between the pivot shafts 222 and 223. Therefore, it is possible that a distance between the pivot shafts 222 and 223 becomes less accurate due to variations in component accuracy. Further, in a case where the left and right doors 211 and 212 are large, it is possible that the component accuracy of those doors becomes also less accurate. Therefore, so as to prevent interference of the left and right doors 211 and 212, which perform the double-door opening, to each other, the gap G with a width of equal to or more than 4 mm and equal to or less than 10 mm is secured in the joint portion of the left and right doors 211 and 212 with respect to the left-right direction.

However, because of a disposition of the gap G, the user sometimes accidentally inserts the finger into the gap G. Further, ridge lines R1 and R2 of the gap G on the front sides of facing surfaces 217 and 218 of the left and right doors 211 and 212 are provided with an R shape having a radius of about 1 to 3 mm, the finger is more likely to be inserted into the gap G. As described above, in the case of the comparative example 2, the user is easy to fail to put the finger on the handle 215 of the left door 211, and easy to fail to open the left door 211. Further, since the fixing unit 8, the colling unit 302 (refer to FIG. 2), and the like disposed in the interior of the casing 600A are seen from the gap G of the joint portion of the left and right doors 122 and 121, the appearance is not good, and, further, there is the fear that the foreign substance may enter from the gap G into the interior of the casing 600A.

In contrast, as described above, in this embodiment, the protrusion portion 134 is extended from the right door 121 to a position facing the handle 131 of the left door 122 (refer to FIG. 10). Thereby, when the user tries to open the left door 122, it is possible to prevent the accidental insertion of the finger into the gap between the left and right doors 122 and 121, and is possible to easily guide the finger to the handle 131. Thereby, the user can open the left door 122 smoothly.

Further, since units which are disposed in the interior of the casing 600A become not to be seen from the gap of the joint portion between the left and right doors 122 and 121 by the protrusion portion 134 disposed on the right door 121, it is possible to provide a good-looking apparatus with ensuring uniformity across the exterior. Further, since the entry of the foreign substance from the gap is prevented by the protrusion portion 134, a stable operation of the image forming system 1 is enabled.

OTHER EMBODIMENTS

Incidentally, in the embodiment described above, an example in which the handle 144 on which the user puts the hand when opening the right door 121 is formed on the back surface of the protrusion portion 134 in the position opposite to the concave portion 132 across the protrusion portion 134 (refer to FIG. 12) has been illustrated. However, in such a case, since it is difficult for the user to recognize the handle 144, serving as a handling position of the right door 122, from the outside, the user gropes for the handle 144, and it takes time to put the hand on the handle 144. Therefore, the handle is preferably formed on the right door 121 in such a manner that the user can quickly recognize the handle and easily put the hand on the handle. Hereinafter, this point will be described using FIGS. 13 to 17. To be noted, in FIGS. 13 to 17, descriptions of configurations similar to the embodiment described above will be simplified or omitted herein by putting the same reference characters on drawings.

Figure 13:
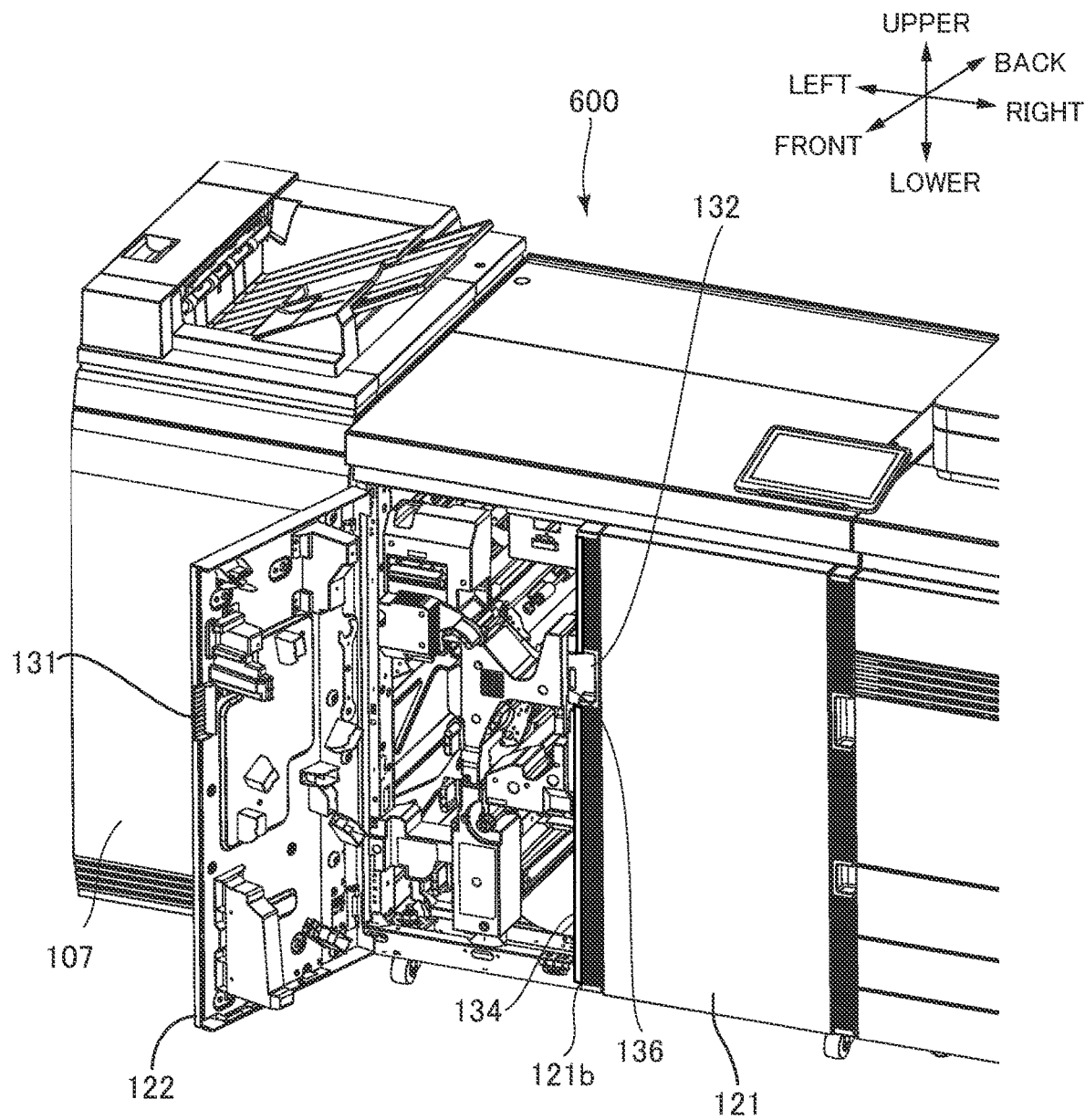
FIG. 13 is a perspective view illustrating the right door to which a protruding shape portion is formed.
Figure 14:
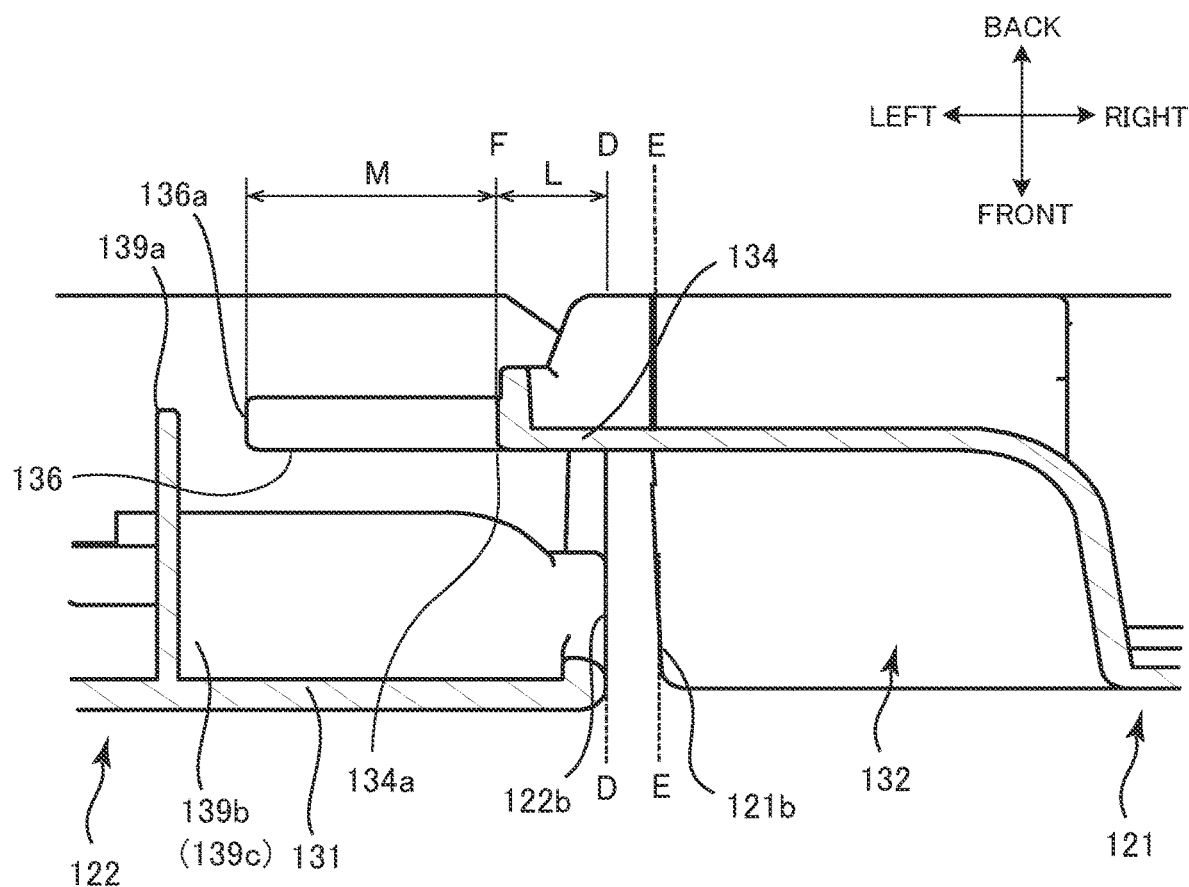
FIG. 14 is a top view illustrating a vicinity of the joint portion of the right door, to which the protruding shape portion is formed, and the left door.

As illustrated in FIGS. 13 and 14, the protrusion portion 134 is formed in the right door 121. The protrusion portion 134 is extended from the position E-E of the facing surface of the second end portion 121b so that the end 134a is positioned in the position F which is further to the side of the left door 122 than the gap between D and E (refer to FIG. 14). The protrusion portion 134 overlaps the handle 131 of the left door 122 by the distance L which is the distance from the position D-D of the facing surface of the first end portion 122b, facing the second end portion 121b of the right door 121 in the state where the left and right doors 122 and 121 are closed, of the left door 122 to the position F of the end 134a.

Further, as illustrated in FIG. 13, in the right door 121, a protruding shape portion 136 protruding from the protrusion portion 134 toward the side of the left door 122 is formed in part of the upper-lower direction of the second end portion 121b. As illustrated in FIG. 14, the protruding shape portion 136 is formed in a shape in which an end 136a is extended from the position F of the end 134a of the protrusion portion 134 toward the side of the left door 122 by a length M with respect to the left-right direction. In other words, the protruding shape portion 136 is formed as part of the protrusion portion 134, and is a part whose length from the second end portion 121B is L plus M. Excluding the protruding shape portion 136, the protrusion portion 134 is extended from the position E-E of the facing surface of the second end portion 121b so as to be positioned in the position F which is further to the side of the left door 122 than the gap between D and E (refer to FIG. 14). That is, at the protruding shape portion 136 and the protrusion portion 134, the right door 121 overlaps the handle 131 of the left door 122 by a distance L plus M which is the distance from the first end portion 122b, facing the second end portion 121b of the right door 121 in the state where the left and right doors 122 and 121 are closed, of the left door 122 to the position of the end 136a.

As illustrated in FIG. 13, the user can visibly recognize the protruding shape portion 136 by viewing from the side of the front surface (front) in the state where the left door 122 is opened. Further, since the protruding shape portion 136 protrudes further toward the side of the left door 122 than other places, it is easy for the user to grip. Therefore, in comparison with the embodiment described above (refer to FIG. 6), the user can clearly recognize the protruding shape portion 136 as the handling position of the right door 121, and can easily open the right door 121 by gripping the protruding shape portion 136.

Figure 24:
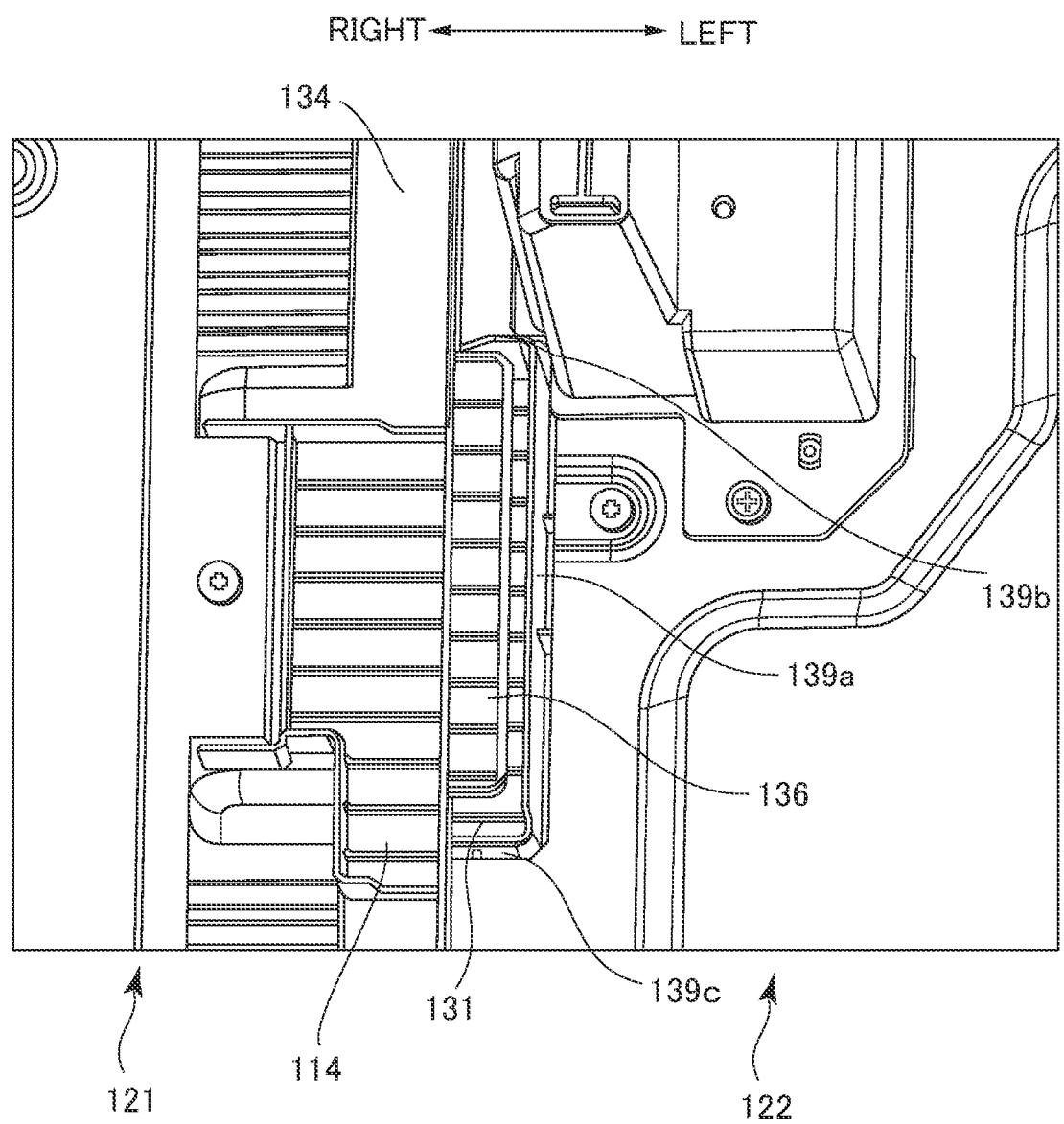
FIG. 24 is an enlarged view illustrating a formation position of the protruding shape portion in a case where a locked state occurs.

Incidentally, in a case disposing the protruding shape portion 136 in the right door 121 as described above, there is the fear that, depending on a forming position of the protruding shape portion 136, the left and right doors 122 and 121 are stuck in a locked state and it is not possible to open and close the left and right doors 122 and 121. The forming position of the protruding shape portion 136 in a case where the locked state occurs is illustrated in FIG. 24. As illustrated in FIG. 24, in a case where, in the state where the left and right doors 122 and 121 are closed, the protruding shape portion 136 is disposed in the space formed by the ribs 139a, 139b, and 139c, which surround the handle 131 of the left door 122, there is the fear that the locked state occurs in the doors.

Figure 25:
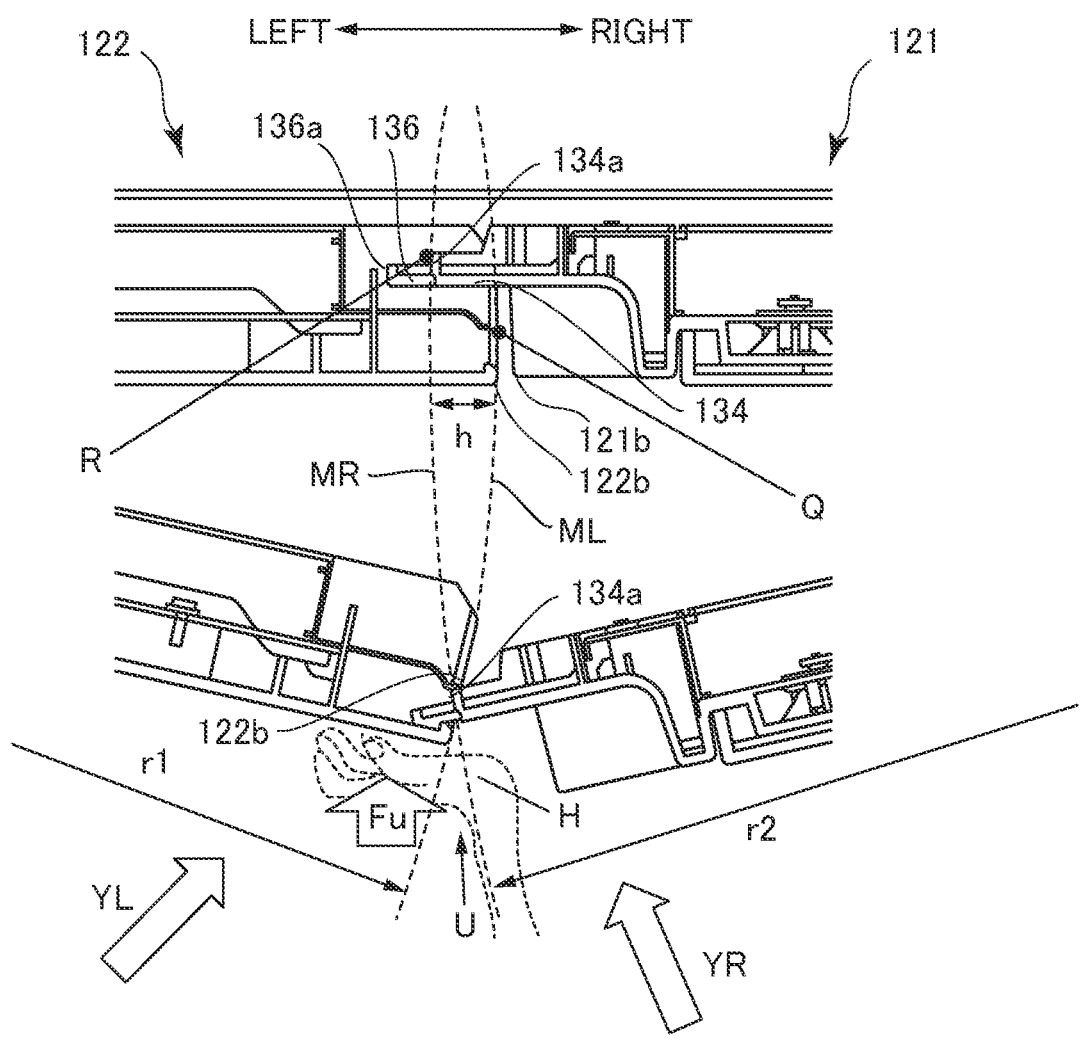
FIG. 25 is a top view illustrating open/close states of the left and right doors in the case where the locked state occurs.

The open/close states of the left and right doors 122 and 121 in a case where the locked state occurs are illustrated in FIG. 25. An upper part of the FIG. 25 illustrates the state where the left and right doors 122 and 121 are closed. A lower part of the FIG. 25 illustrates a state where the end 134a of the protrusion portion 134 of the right door 121 comes into contact with the first end portion 122b of the left door 121. When closing both of the left and right doors 122 and 121 from the state where both of the left and right doors 122 and 121 are opened, the facing surfaces of the first end portion 122b of the left door 122 and the second end portion 121b of the right door 121 facing each other interfere with each other. At that time, as illustrated in the lower part of FIG. 25, the end 134a of the protrusion portion 134 of the right door 121 comes into contact with the first end portion 122b of the left door 122.

As illustrated in FIG. 25, the sum of a pivot radius r1 of the first end portion 122b of the left door 122 (point Q) and a pivot radius r2 of the end 134a (point R) of the protrusion portion 134 of the right door 121 is larger than a distance (not shown) between the pivot axes of the left and right doors 122 and 121. Therefore, when the left and right doors 122 and 121 further pivot in respective closing directions of the arrow YR and YL directions from the state illustrated in the lower part of FIG. 25, respective pivot loci ML and MR of the first end portion 122b of the left door 122 and the end 134a of the protrusion portion 134 of the right door 121 intersect with each other. An interference amount h is a distance between the loci in the left-right direction at this time. In a case where the user applies a pushing force Fu onto the left and right doors 122 and 121 in the arrow YR and YL directions from the state illustrated in the lower part of FIG. 25, when the force becomes equal to or larger than a force which deforms the left and right doors 122 and 121, the interference amount h of the left and right doors 122 and 121 increases, and the so-called locked state where it is not possible to open nor close the doors occurs.

Figure 15:
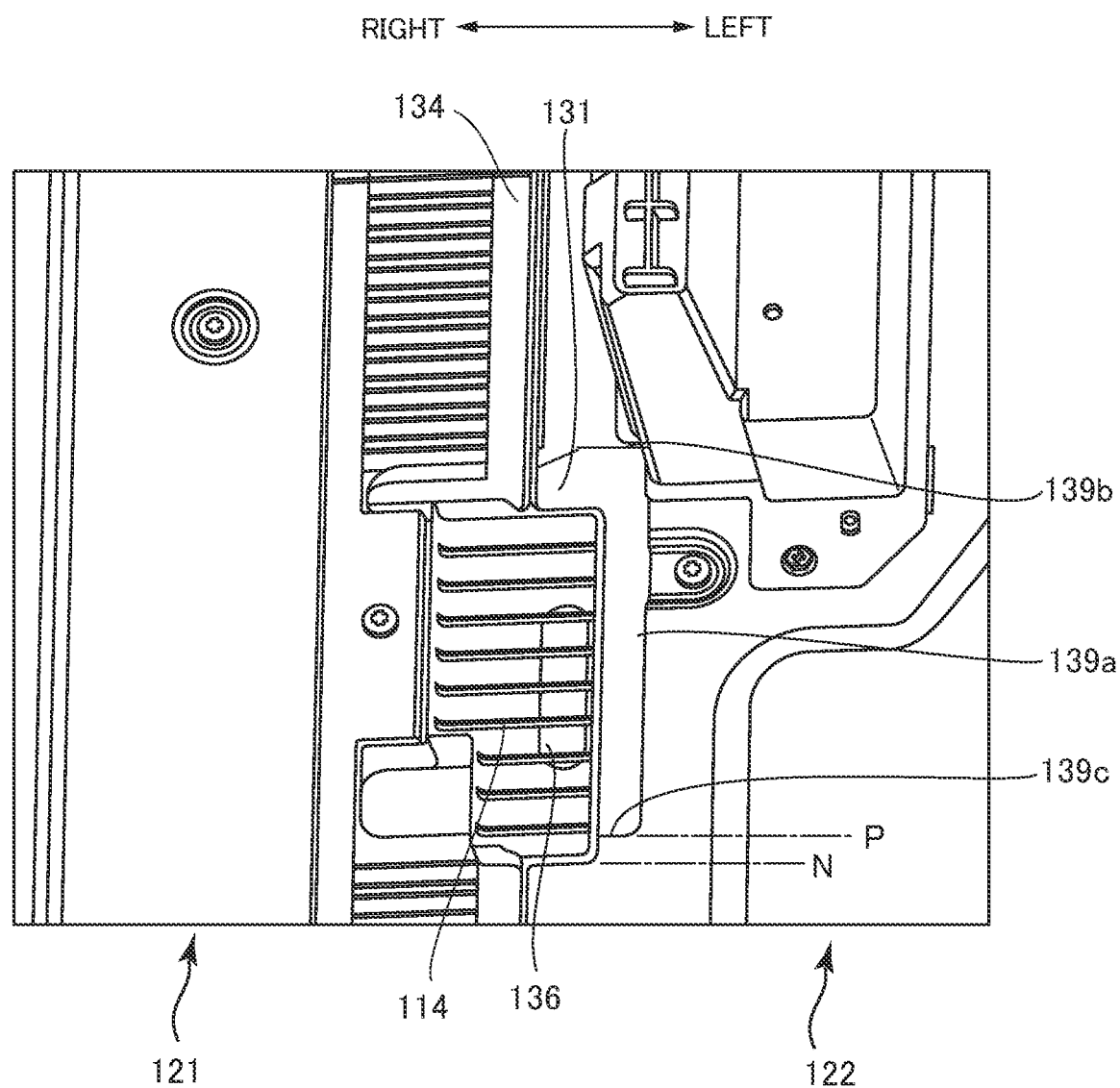
FIG. 15 is a perspective view illustrating the interiors of the right door, to which the protruding shape portion is formed, and the left door.
Figure 16:
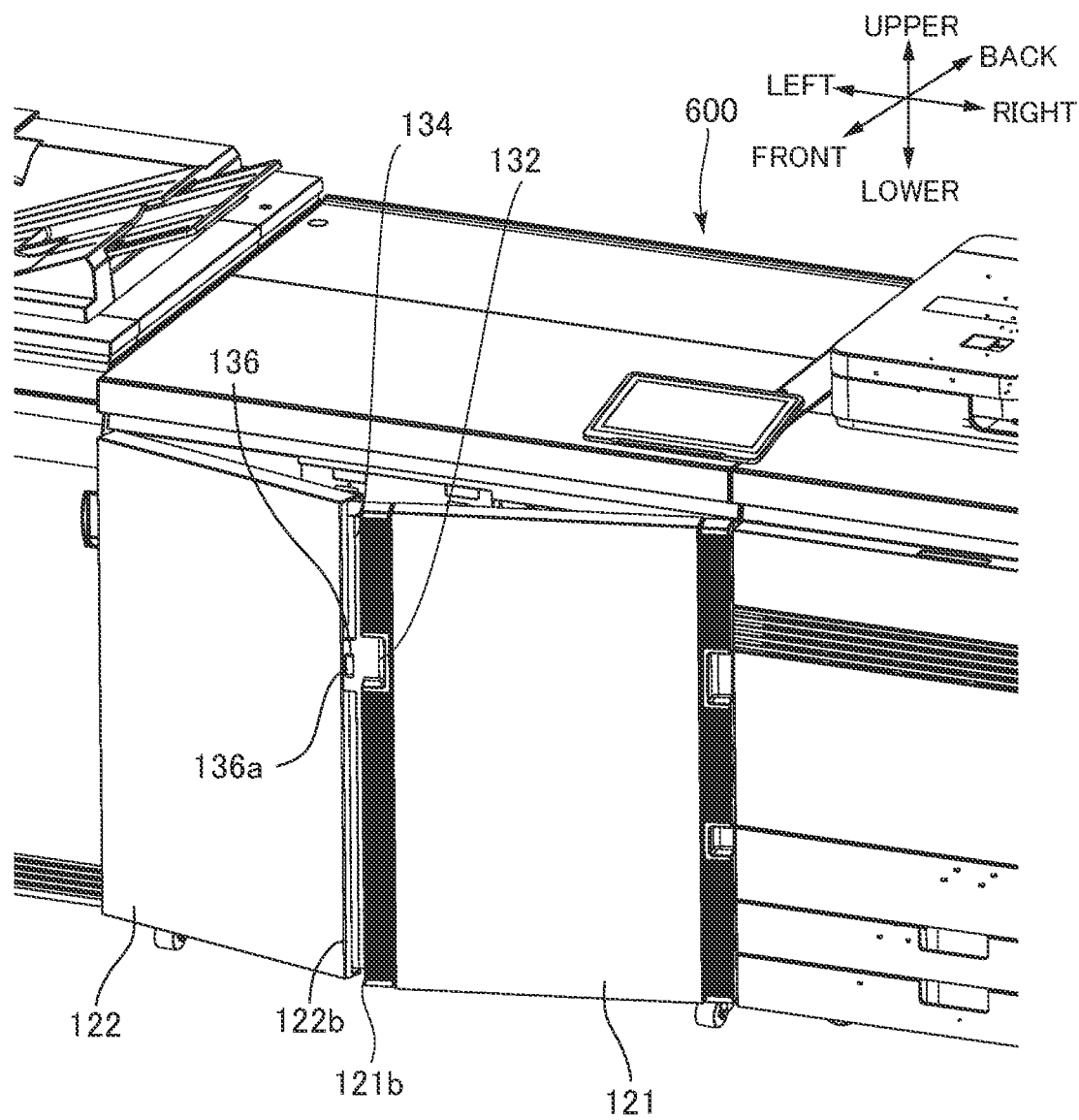
FIG. 16 is a perspective view illustrating the right door, to which the protruding shape portion is formed, and the left door.

Therefore, so as to suppress an occurrence of the locked state, in this embodiment, as illustrated in FIG. 15, the protruding shape portion 136 of the right door 121 is formed so as to position a lower end position N of the protruding shape portion 136 below a lower end position P of the handle 131 of the left door 122, in particular, the lower end position P of the rib 139 on the lower side. In a case described above, when closing both of the left and right doors 122 and 121 from the state where both of the left and right doors 122 and 121 are opened, as illustrated in FIG. 16, the end 136*a* of the protruding shape portion 136 of the right door 121 falls into a state where the end 136*a* interferes with the first end portion 122*b* of the left door 122.

Figure 17:
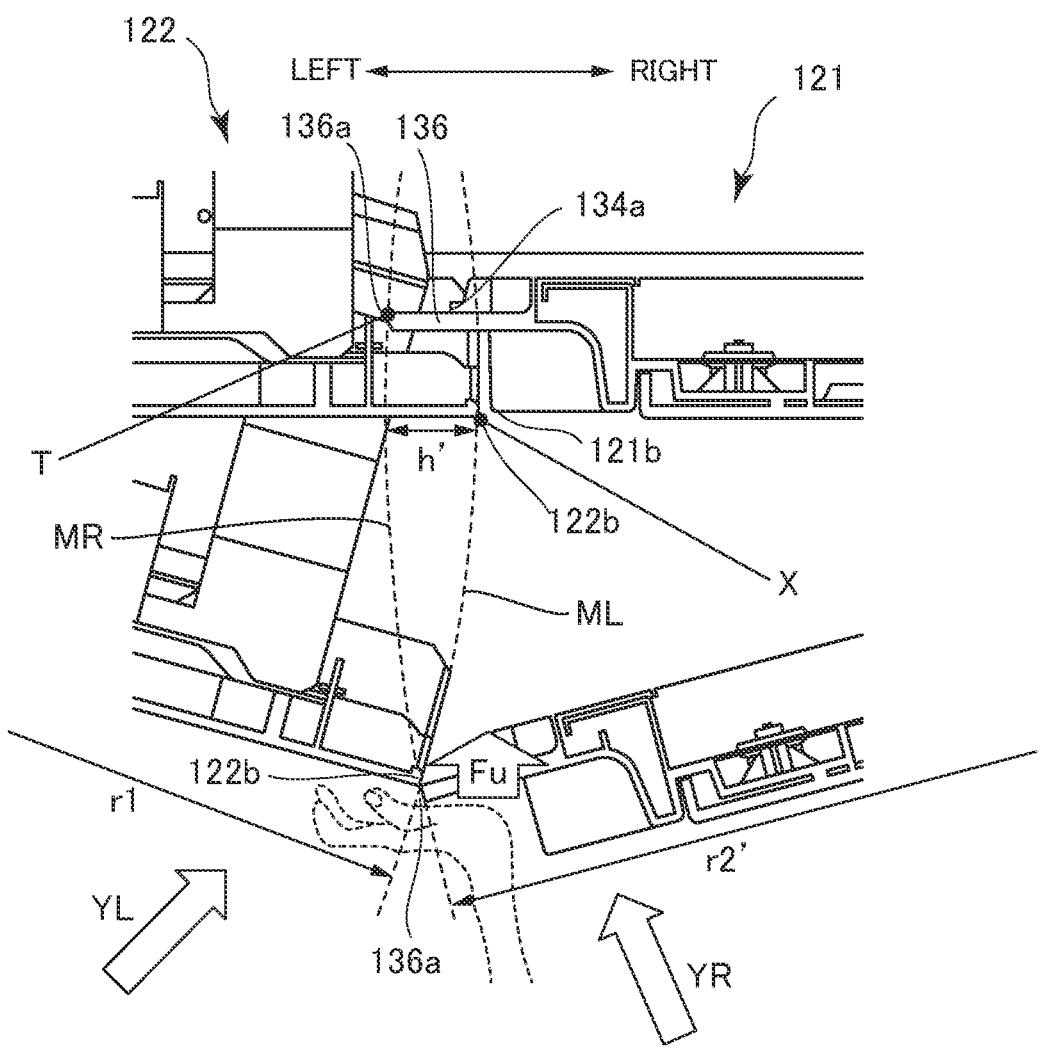
FIG. 17 is a top view for descriptions of the opening and closing of the doors in a case where the protruding shape portion is formed.

FIG. 17 illustrates the pivot locus MR drawn by the end 136*a* (point T) of the protrusion portion 136 of the right door 121 and the pivot locus ML drawn by the first end portion 122*b* (point X) of the left door 12. The pivot loci MR and ML illustrated in FIG. 17 are pivot loci that are drawn in a case where the user further applies the pushing force Fu to the left and right doors 122 and 121 in the arrow YR and YL directions from the state illustrated in FIG. 16. In the case of this embodiment, as illustrated in FIG. 17, a pivot radius r2' of the first end portion 122*b* becomes larger than the pivot radius r2 illustrated in FIG. 25, and the interference amount h' of both doors at the occurrence of the locked state becomes larger than the interference amount h illustrated in FIG. 25. Therefore, since it is possible to increase the stiffness of the left and right doors 122 and 121 to an extent that both doors do not deform until the interference amount exceeds the interference amount h' which is required for deforming both doors, it is possible to avoid the locked state. That is, in the configuration of the FIG. 25, since the protrusion portion 136 will be in the handle 131 when the left and right doors 122 and 121 are closed in a state where the end 134*a* and the first end portion 122*b* interfere, the left and right doors 122 and 121 might close with deforming. This state is the locked state. On the other hand, in the configuration of the FIG. 17, since the end 134*a* and the first end portion 122*b* do not interfere, the left and right doors 122 and 121 might not close with deforming. To be noted, while illustrations are omitted herein, it is acceptable that the protruding shape portion 136 is formed such that an upper end position of the protruding shape portion 136 is positioned above an upper end position of the handle 131 of the left door 122, in particular, an upper end position of the rib 139*b* (refer to FIG. 9) on the upper side.

Next, with reference to FIG. 7, the left door pivot portion 900 for pivoting the left door 122 will be described using FIG. 18. As illustrated in FIG. 7, the left door 122 is pivotably supported in an openable and closable manner by two left door pivot portions 900 disposed in the upper-lower direction of the casing 600A. These two left door pivot portions 900 are the same in a configuration.

Figure 18:
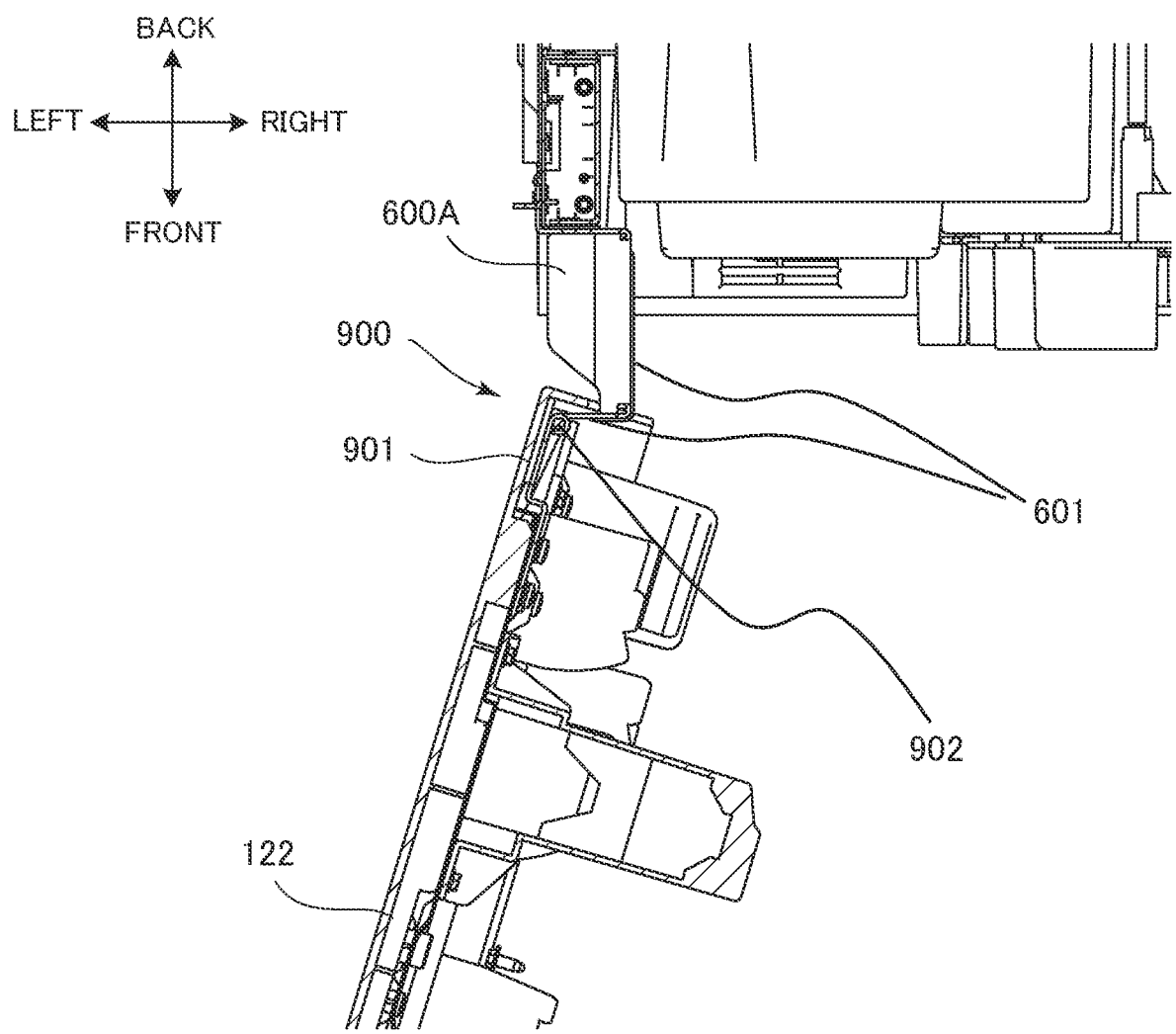
FIG. 18 is a top view illustrating a pivot portion of the left door.

As illustrated in FIG. 18, the left door pivot portion 900 includes a frame side sheet metal 601 secured to the casing 600A, a door side sheet metal 901 secured to the left door 122, and a pin 902 inserted through fitting holes respectively disposed in the frame side sheet metal 601 and the door side sheet metal 901. The left door 122 pivots around the pins 902 as centers. That is, the pins 902 form the first pivot shaft 122*a* described above. A maximum opening angle of the left door pivot portion 900 with respect to the casing 600A is set at, for example, 110 degrees.

Next, with reference to FIG. 7, the right door pivot portion 950 for pivoting the right door 121 will be described using FIG. 19. As illustrated in FIG. 7, the right door 121 is pivotably supported in an openable and closable manner by two right door pivot portions 950 disposed in the upper-lower direction of the casing 600A. These two right door pivot portions 950 are the same in a configuration.

Figure 19:
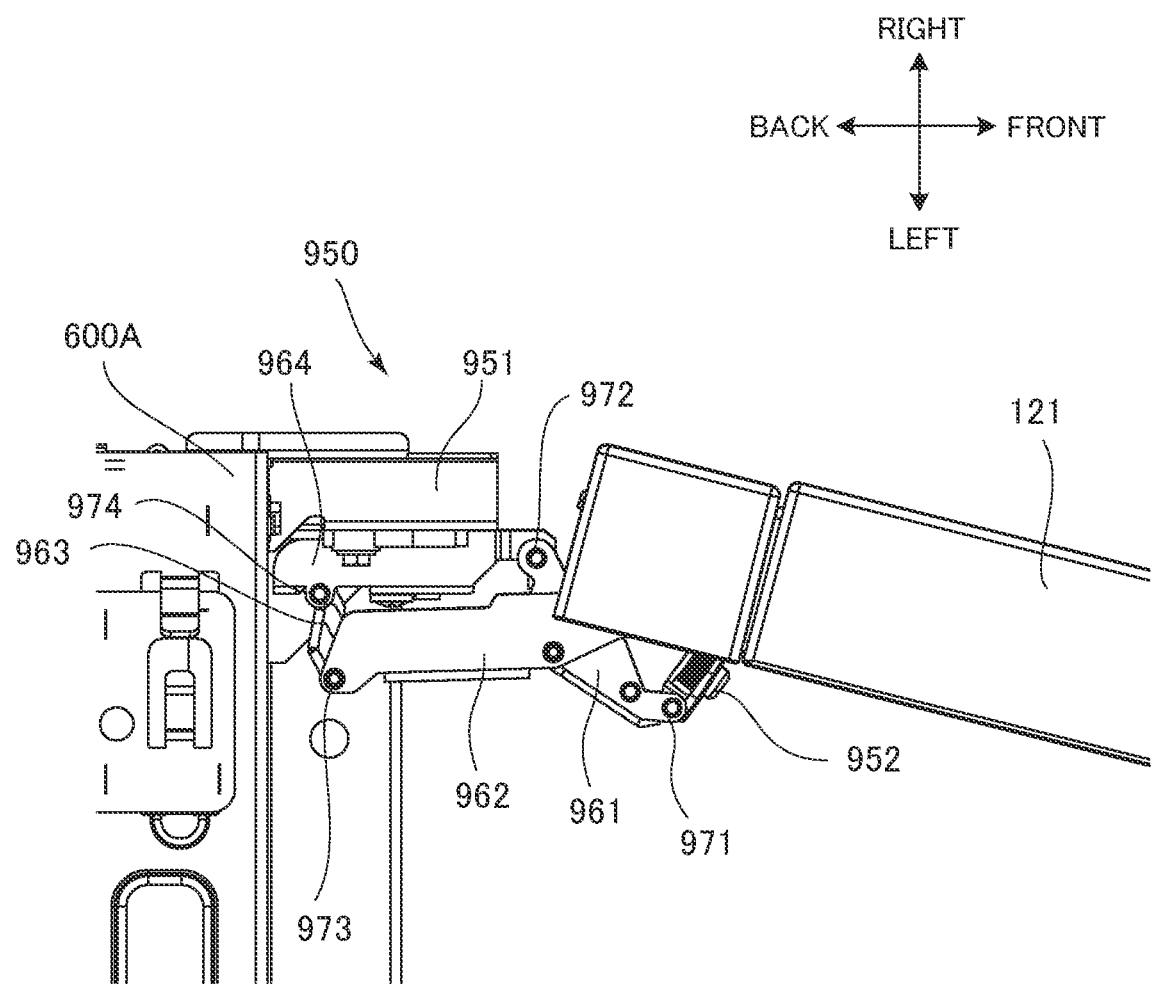
FIG. 19 is a top view illustrating a pivot portion of the right door.

As illustrated in FIG. 19, the right door pivot portion 950 includes a frame side sheet metal 951 secured to the casing 600A, a door side connection portion 952 secured to the right door 121, and a first, second, and third connection portion 961, 962, and 963, and a frame side connection portion 964. The first, second, and third connection portions 961, 962, and 963, and the frame side connection portion 964 pivotably connect the frame side sheet metal 951 and the door side connection portion 952. The door side connection portion 952 is disposed so as to be pivotable with respect to the first connection portion 961 by a pivot shaft 971 inserted through fitting holes of the first connection portion 961 and the door side connection portion 952.

The first connection portion 961 is disposed so as to be pivotable with respect to the frame side sheet metal 951 by a pivot shaft 972 inserted through a fitting hole of the frame side sheet metal 951 and the fitting hole of the first connection portion 961. The second connection portion 962 is disposed so as to be pivotable with respect to the third connection portion 963 by a pivot shaft 973 inserted through fitting holes of the second and third connection portions 962 and 963. The third connection portion 963 is disposed so as to be pivotable with respect to the frame side connection portion 964 by a pivot shaft 974 inserted through a fitting hole of the frame side connection portion 964 and the fitting hole of the third connection portion 963. The frame side connection portion 964, the door side connection portion 952, and the first to third connection portions 961 to 963 are formed by, for example, zinc die casting.

By including a plurality of pivot shafts 971 to 974 as described above, a maximum opening angle of the right door pivot portion 950 is set at, for example, 170 degrees which is larger than the maximum opening angle of the left door. Since, thereby, the user can easily draw out the fixing unit 8 in the interior of the casing 600A, it is preferable, for example, since it becomes easy to remove the recording material S stuck in the fixing unit 8. To be noted, in this case, any of the plurality of pivot shafts 971 to 974 can form the second pivot shaft 121*a* describe above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-011687, filed Jan. 28, 2022 which is hereby incorporated by reference herein in its entirety.

What is claimed is:

1. An image forming apparatus comprising:
   an image forming unit configured to form an image on a sheet;
   a casing accommodating the image forming unit; and
   first and second doors configured to open from a center, wherein:
   the first door is configured to pivot around a first pivot axis to open and close with respect to the casing, and includes:
   a handle disposed on an opposite surface of an exterior surface of the first door,
   the second door is configured to pivot around a second pivot axis to open and close with respect to the casing, and includes:
   a protrusion portion protruding from an end of the second door toward the first door in a first direction intersecting with the second pivot axis and extending from an exterior surface of the second door, in a state where the first and second doors are closed,
   in the state where the first and second doors are closed:

a first gap exists in the first direction, between an edge of the second door and an edge of the handle, the first gap being configured to allow part of operator's hand passes therethrough, the protrusion portion faces the handle disposed on the opposite surface of the exterior surface of the first door in a front-back direction of the image forming apparatus, and a second gap exists in the front-back direction, between the handle and the protrusion portion, the second gap being configured to allow the part of operator's hand to pass therethrough.

2. The image forming apparatus according to claim 1, wherein the protrusion portion is disposed extending from an upper end to a lower end of the second door in a direction along the second pivot axis.

3. The image forming apparatus according to claim 1, wherein the second door includes a protruding shape portion protruding from the protrusion portion in the first direction along the exterior surface of the second door.

4. The image forming apparatus according to claim 3, wherein a lower end of the protruding shape portion is positioned below a lower end of the handle in a direction along the second pivot axis.

5. The image forming apparatus according to claim 3, wherein an upper end of the protruding shape portion is positioned above an upper end of the handle in a direction along the second pivot axis.

6. The image forming apparatus according to claim 1, wherein directions of the first pivot axis and the second pivot axis are parallel to a vertical direction respectively.

7. The image forming apparatus according to claim 1, wherein:

the first door includes one of:
   a first magnet or a first metal member disposed at a position above the handle in a direction along the first pivot axis; and
   a second magnet or a second metal member disposed at a position below the handle in the direction along the first pivot axis, the casing includes the other of:
   the first magnet or the first metal member disposed at a position facing the one of the first magnet or the first metal member, in a state where the first door is closed; and
   the second magnet or the second metal member disposed at a position facing the one of the second magnet or the second metal member, in the state where the first door is closed, and in the state where the first door is closed, the first magnet attracts the first metal member and the second magnet attracts the second metal member.

8. The image forming apparatus according to claim 1, wherein:

the second door includes one of:
   a first magnet or a first metal member disposed at a position above the handle in a direction along the second pivot axis; and
   second magnet or a second metal member disposed at a position below the handle in the direction along the second pivot axis, the casing includes the other of:
   the first magnet or the first metal member disposed at a position facing the one of the first magnet or the first metal member, in a state where the second door is closed; and
   the fourth second magnet or the second metal member disposed at a position facing the one of the second magnet or the second metal member, in the state where the second door is closed, and in the state where the second door is closed, the first magnet attracts the first metal member and the second magnet attracts the second metal member.

* * * * *